(12) United States Patent
Cha et al.

(10) Patent No.: US 11,326,104 B2
(45) Date of Patent: May 10, 2022

(54) PROCESS FOR PREPARING FLAME RETARDANT COMPOSITIONS

(71) Applicant: CHESTNUT SPRINGS LLC, Ridgefield, CT (US)

(72) Inventors: Randall Cher Liang Cha, Singapore (SG); Sufan Siauw, Shatin (HK); Ralph T. Webdale, Redding, CT (US)

(73) Assignee: Chestnut Springs LLC, Ridgefield, CT (US)

( * ) Notice: Subject to any disclaimer, the term of this patent is extended or adjusted under 35 U.S.C. 154(b) by 114 days.

(21) Appl. No.: 16/929,273

(22) Filed: Jul. 15, 2020

(65) Prior Publication Data

US 2020/0369963 A1 Nov. 26, 2020

Related U.S. Application Data

(62) Division of application No. 15/820,720, filed on Nov. 22, 2017, now Pat. No. 10,752,840.

(Continued)

(51) Int. Cl.
| | |
|---|---|
| C09K 21/04 | (2006.01) |
| C09K 21/10 | (2006.01) |
| C09K 21/02 | (2006.01) |
| C09K 21/14 | (2006.01) |
| C08K 3/32 | (2006.01) |
| C08L 1/02 | (2006.01) |
| C08L 3/02 | (2006.01) |

(52) U.S. Cl.
CPC ............... *C09K 21/04* (2013.01); *C08K 3/32* (2013.01); *C09K 21/02* (2013.01); *C09K 21/10* (2013.01); *C09K 21/14* (2013.01); *C08K 2003/322* (2013.01); *C08K 2003/323* (2013.01); *C08L 1/02* (2013.01); *C08L 3/02* (2013.01)

(58) Field of Classification Search
USPC .................. 442/139, 140, 153; 428/403, 920
See application file for complete search history.

(56) References Cited

U.S. PATENT DOCUMENTS

| | | |
|---|---|---|
| 4,888,136 A | 12/1989 | Chellapa et al. |
| 5,599,626 A | 2/1997 | Fukumura et al. |

(Continued)

OTHER PUBLICATIONS

International Search Report for the corresponding International Application PCT/US2017/063012, dated Feb. 5, 2018, 3 pages.

(Continued)

*Primary Examiner* — Lynda Salvatore
(74) *Attorney, Agent, or Firm* — Ohlandt, Greeley, Ruggiero & Perle, L.L.P.

(57) ABSTRACT

A process for preparing a flame retardant composition, the process comprising: adding to a container at least one flame retardant salt, a nitrogen-containing compound, and optionally water; and mixing the contents of the container to give a dispersed mixture or dissolved solution comprising the flame retardant composition; wherein the at least one flame retardant salt comprises an ammonium salt of phosphoric acid; wherein the ammonium salt of phosphoric acid comprises water soluble ammonium polyphosphate (APP); wherein the water soluble ammonium polyphosphate has a total nitrogen as N from about 5 to about 15 weight percent, and a total phosphorus as $P_2O_5$ from about 30 to about 40 weight percent, based on the total weight of the ammonium polyphosphate (APP).

18 Claims, 2 Drawing Sheets

Related U.S. Application Data

(60) Provisional application No. 62/425,202, filed on Nov. 22, 2016.

(56) References Cited

U.S. PATENT DOCUMENTS

| 6,153,544 A | 11/2000 | Radwanski et al. |
| 2016/0340517 A1 | 11/2016 | Simpson |

OTHER PUBLICATIONS

Written Opinion of the International Searching Authority for the corresponding International Application PCT/US2017/063012, dated Feb. 5, 2018, 7 pages.

International Preliminary Report on Patentability dated May 13, 2019 from corresponding International (PCT) Patent Application No. PCT/US2017/063012, 17 pages.

PROCESS FOR PREPARING FLAME RETARDANT COMPOSITIONS

RELATED APPLICATION

This is a divisional application of U.S. patent application Ser. No. 15/820,720, filed on Nov. 22, 2017 and claims the benefit of U.S. Provisional Application Ser. No. 62/425,202, filed on Nov. 22, 2016, both of which are incorporated herein by reference in their entirety.

BACKGROUND

1. Field of the Disclosure

This disclosure relates to flame retardant compositions and water-based compositions, processes for preparing flame retardant compositions and water-based compositions, processes for the production of an extruded articles, processes for imparting flame retardancy to substrate materials, intumescent processes for forming an insulating protective layer on a substrate, and fire retardant articles.

2. Description of the Related Art

Flame retardants are a key component in reducing the devastating impact of fires on people, property and the environment. They are added to or treat potentially flammable materials, including textiles and plastics. The term "flame retardant" refers to a function, not a family of chemicals. A variety of different chemicals, with different properties and structures, act as flame retardants and these chemicals are often combined for effectiveness.

Flame retardants are added to different materials or applied as a treatment to materials (e.g., textiles, plastics) to prevent fires from starting, limit the spread of fire, and minimize fire damage. Some flame retardants work effectively on their own; others act as "synergists" to increase the fire protective benefits of other flame retardants. A variety of flame retardants is necessary because materials that need to be made fire-resistant are very different in their physical nature and chemical composition, so they behave differently during combustion. The elements in flame retardants also react differently with fire. As a result, flame retardants have to be matched appropriately to each type of material. Flame retardants work to stop or delay fire, but, depending on their chemical makeup, they interact at different stages of the fire cycle.

In the fire cycle, the initial ignition source can be any energy source (e.g., heat, incandescent material, a small flame). The ignition source causes the material to burn and decompose (pyrolysis), releasing flammable gases. If solid materials do not break down into gases, they remain in a condensed phase. During this phase, they will slowly smolder and, often, self-extinguish, especially if they "char," meaning the material creates a carbonated barrier between the flame and the underlying material. In the gas phase, flammable gases released from the material are mixed with oxygen from the air. In the combustion zone, or the burning phase, fuel, oxygen and free radicals combine to create chemical reactions that cause visible flames to appear. The fire then becomes self-sustaining because, as it continues to burn the material, more flammable gases are released, feeding the combustion process.

When flame retardants are present in the material, they can act in three key ways to stop the burning process. They may work to: disrupt the combustion stage of a fire cycle, including avoiding or delaying "flashover," or the burst of flames that engulfs a room and makes it much more difficult to escape; limit the process of decomposition by physically insulating the available fuel sources from the material source with a fire-resisting "char" layer; and/or dilute the flammable gases and oxygen concentrations in the flame formation zone by emitting water, nitrogen or other inert gases.

Many flame retardants are limited in their end use applications because of physical constraints (e.g., liquids or solids). For example, liquid flame retardant compositions must be topically sprayed onto finished products to impart flame retardancy to those products. Their application is limited to finished products.

It would be desirable in the art to have flame retardants that are not limited in their end use applications because of physical constraints (e.g., liquids or solids). In particular, it would be desirable to have flame retardant compositions that are effective as solids and liquids, and thus greatly expand their potential end use applications. Further, in particular, it would be desirable to have flame retardant compositions that are effective as solids (e.g., powders) and can be formulated (e.g., extruded) with unfinished products, and also that are effective as liquids (e.g., water based solutions) and can be sprayed onto finished products. Still further, it would be desirable to have flame retardant compositions that are not corrosive to metals.

SUMMARY

This disclosure relates in part to a composition comprising one or more substrate materials and a flame retardant powder composition. The flame retardant powder composition comprises at least one flame retardant salt, and a nitrogen-containing compound.

This disclosure also relates in part to a composition comprising one or more substrate materials and a flame retardant composition. The flame retardant composition comprises at least one flame retardant salt, a nitrogen-containing compound, and water.

This disclosure further relates in part to a composition comprising one or more substrate materials and a flame retardant composition. The flame retardant composition comprises at least one flame retardant salt, a nitrogen-containing compound, and optionally water. The at least one flame retardant salt comprises water soluble ammonium polyphosphate (APP), and the nitrogen-containing compound comprises urea.

This disclosure yet further relates in part to a one or more substrate materials and a flame retardant composition. The flame retardant composition comprises at least one flame retardant salt, a nitrogen-containing compound, and optionally water. The at least one flame retardant salt comprises water soluble ammonium polyphosphate (APP), ammonium dihydrogen phosphate (MAP), and di-ammonium hydrogen phosphate (DAP); and the nitrogen-containing compound comprises urea.

This disclosure also relates in part to a composition comprising one or more substrate materials and a flame retardant composition. The flame retardant composition comprises at least one flame retardant salt, a nitrogen-containing compound, and optionally water. The at least one flame retardant salt comprises water soluble ammonium polyphosphate (APP) and ammonium bromide; and the nitrogen-containing compound comprises urea.

This disclosure further relates in part to a composition comprising one or more substrate materials and a flame retardant composition. The flame retardant composition comprises at least one flame retardant salt, optionally a nitrogen-containing compound, and optionally water. The at least one flame retardant salt comprises water soluble ammonium polyphosphate (APP).

This disclosure still further relates in part to a flame retardant composition comprising at least one flame retardant salt, optionally a nitrogen-containing compound, and optionally water. The at least one flame retardant salt comprises water soluble ammonium polyphosphate (APP). The water soluble ammonium polyphosphate (APP) has a total nitrogen as N from about 5 to about 15 weight percent, and a total phosphorus as $P_2O_5$ from about 30 to about 40 weight percent, based on the total weight of the ammonium polyphosphate. The water soluble ammonium polyphosphate (APP) has a density from about 1.75 to about 1.90 $g/cm^3$, a water solubility of greater than about 60 g/100 ml, and a pH from about 6.5 to about 8.5.

This disclosure also relates in part to an article formed from a composition. The composition comprises one or more substrate materials and a flame retardant composition. The flame retardant composition comprises at least one flame retardant salt, a nitrogen-containing compound, and optionally water. The article comprises (i) a polymer article selected from a polymer molding, a polymer film, a polymer filament and a polymer fiber; or (ii) an extrusion article formed by extrusion, injection molding, or a combination thereof.

This disclosure further relates in part to a process for the production of an extruded article. The process comprises (a) heating a polymer to form a polymer melt; (b) adding a flame retardant powder composition to the polymer melt to form a flame retardant polymer melt; and (c) extruding the flame retardant polymer melt to give an extruded article. The flame retardant composition comprises at least one flame retardant salt, and a nitrogen-containing compound.

This disclosure still further relates in part to a process for imparting flame retardancy to a substrate material. The process comprises adding to the substrate material a flame retardant composition. The flame retardant composition comprises at least one flame retardant salt, a nitrogen-containing compound, and optionally water.

This disclosure also relates in part to a process for preparing a flame retardant powder composition. The process comprises (a) adding to a container at least one flame retardant salt, and a nitrogen-containing compound; and (b) mixing the contents of the container to give a dispersed mixture or dissolved solution comprising the flame retardant composition.

This disclosure further relates in part to a process for preparing a flame retardant water based composition. The process comprises (a) adding to a container at least one flame retardant salt, a nitrogen-containing compound, and water; and (b) mixing the contents of the container to give a dispersed mixture or dissolved solution comprising the flame retardant composition.

This disclosure yet further relates in part to an intumescent process for forming an insulating protective layer on a substrate. The process comprises: (a) providing a flame retardant composition comprising at least one flame retardant salt, a nitrogen-containing compound, and optionally water, in which the at least one flame retardant salt comprises an ammonium salt of phosphoric acid, and the nitrogen-containing compound comprises urea; (b) heating the ammonium salt of phosphoric acid to give an inorganic acid; (c) carbonizing the inorganic acid with a polyalcohol present in the substrate; (d) hydrolyzing the urea to give ammonia and reacting the ammonia to give nitrogen gas; (e) foaming the mixture of the carbonized inorganic acid and the nitrogen gas; and (f) solidifying the foam through one or more cross linking reactions to form the insulating protective layer on the substrate.

A process for preparing a flame retardant composition, said process comprising: adding to a container at least one flame retardant salt, a nitrogen-containing compound, and optionally water; and mixing the contents of the container to give a dispersed mixture or dissolved solution comprising the flame retardant composition; wherein the at least one flame retardant salt comprises an ammonium salt of phosphoric acid; wherein the ammonium salt of phosphoric acid comprises water soluble ammonium polyphosphate (APP); wherein the water soluble ammonium polyphosphate has a total nitrogen as N from about 5 to about 15 weight percent, and a total phosphorus as $P_2O_5$ from about 30 to about 40 weight percent, based on the total weight of the ammonium polyphosphate (APP).

The nitrogen-containing compound comprises urea.

The ammonium salt of phosphoric acid further comprises ammonium dihydrogen phosphate (MAP) and di-ammonium hydrogen phosphate (DAP).

The at least one flame retardant salt further comprises an ammonium salt of bromine; and the nitrogen-containing compound comprises urea. The ammonium salt of bromine comprises ammonium bromide.

The water soluble ammonium polyphosphate has a density from about 1.75 to about 1.90 $g/cm^3$, a water solubility of greater than about 60 g/100 ml, and a pH from about 6.5 to about 8.5.

The flame retardant composition comprises from about 10 to about 90 weight percent of the at least one flame retardant salt, and from about 10 to about 60 weight percent of the at least one nitrogen-containing compound; wherein the entirety of the components is 100 weight percent.

The flame retardant composition is sprayed onto a substrate material, impregnated into a substrate material, a substrate material is dipped into the flame retardant composition, or the flame retardant is added to a fiber yarn.

The substrate material is at least one selected from the group consisting of electronics or electrical devices, building or construction materials, furnishings, clothing, and transportation.

The substrate material is at least one material selected from the group consisting of: polymers, rubbers, paper pulps, textiles, foams, metals, lumber, concrete, stone, paints, adhesives, and nano particles.

The polymer comprises a thermoplastic polymer or a thermoset polymer; wherein the thermoplastic polymer is at least one selected from the group consisting of: high impact polystyrene, polyphenylene ethers, polyamides, polyesters, polycarbonates, polyolefins, polyethers, and blends or polyblends of the type represented by ABS (acrylonitrile-butadiene-styrene) or PC/ABS (polycarbonate/acrylonitrile-butadiene-styrene), polyamide, polyester, polyarylates, polymethacrylates, or ABS; and wherein the thermoset polymer is at least one selected from the group consisting of: formaldehyde, epoxy, melamine, or phenolic resin polymers, and polyurethanes.

The substrate material is present in an amount from about 5 weight percent to about 95 weight percent, and the flame retardant composition is present in an amount from about 5 weight percent to about 95 weight percent, wherein the entirety of the components is 100 weight percent.

The flame retardant composition further comprises at least one additive selected from the group consisting of a pigment, a dye, a plasticizer, an antioxidant, a surfactant, a dispersant, a detergent, a wetting agent, an emulsifier, an adsorbent, a binder, a suppressant, a thixotropic agent, a leveling assistant, a basic co-stabilizer, a metal passivator, a metal oxide, an organophosphorus compound, a corrosion inhibitor, a foaming agent, a viscosity modifier, and a light stabilizer.

The flame retardant composition comprises at least one additive selected from the group consisting of alum (hydrated potassium aluminum sulfate), sodium stannate, sodium or potassium silicate (liquid glass), sodium borate (borax), carboxymethyl cellulose, starch-like compound, organophosphorus nitrogen compound, glycerin or glycerol, isocyanate, polyurethane, organosilicone, pentaerythitol, and 4A natural zeolite.

The flame retardant composition further comprises a solvent.

The flame retardant composition is a powder, solution, dispersion, suspension, or melt.

The flame retardant composition comprises at least one flame retardant salt, optionally a nitrogen-containing compound, and optionally water, wherein the at least one flame retardant salt comprises water soluble ammonium polyphosphate (APP), and wherein the water soluble ammonium polyphosphate (APP) has a density from about 1.75 to about 1.90 $g/cm^3$, a water solubility of greater than about 60 g/100 ml, a pH from about 6.5 to about 8.5, and a total nitrogen as N from about 5 to about 15 weight percent, and a total phosphorus as $P_2O_5$ from about 30 to about 40 weight percent, based on the total weight of the ammonium polyphosphate (APP).

The present disclosure provides many advantages including, but not limited to (1) the advantage of a water-based system over a solvent system in terms of transportation (not classified as dangerous goods) and economic costs; (2) the advantage of a water-based system over a solvent system in terms of ease to form new systems with added performance other than flame protection, by mixing with many water soluble additives; (3) other than Ready-To-Use (RTU), the advantages of having the flame retardant in powder form rather than in liquid form (no worrying about freezing and thawing issues, can incorporate into a condensed aerosol fire suppression system, can be used in powder fire extinguishers, etc.); and (4) the advantage of new flame retardant powder with no flame retardant additives that are hygroscopic (e.g., ammonia sulphate)—longer shelf life, higher ease of handling, etc.).

Further objects, features and advantages of the present disclosure will be understood by reference to the following drawings and detailed description.

DESCRIPTION OF THE PREFERRED EMBODIMENTS

Figure 1:
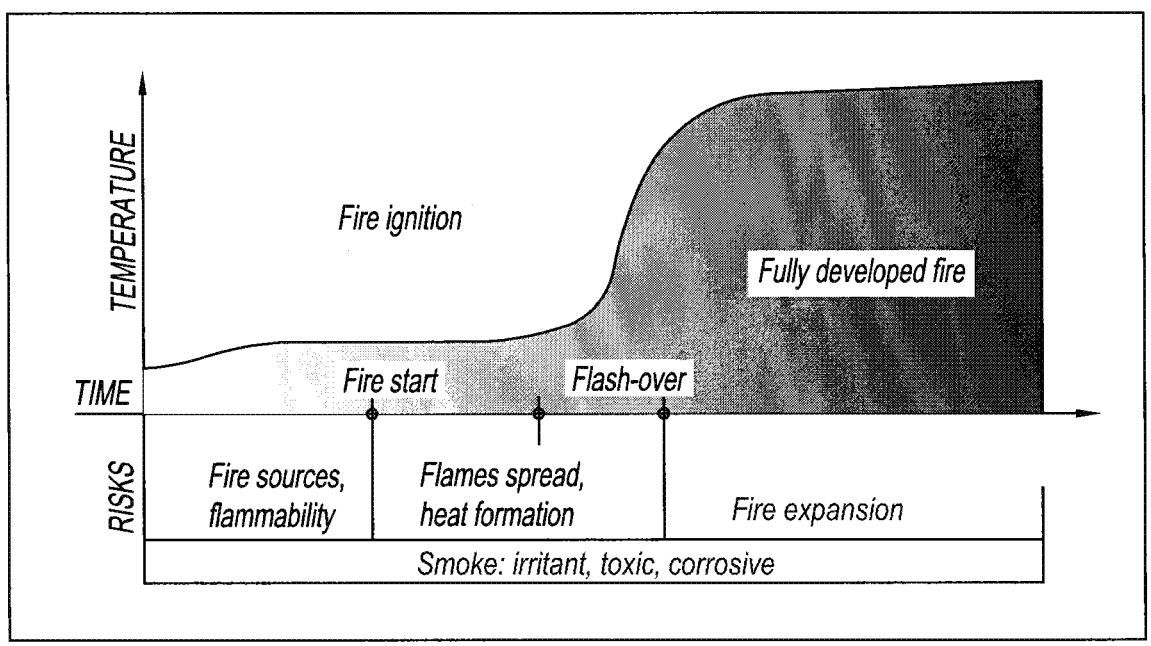
FIG. 1 shows the development of a fire carried out in 3 phases.

The development of a fire is carried out in 3 phases, namely, (1) initiating fire, (2) fully developed fire, and (3) the decreasing fire, as shown in FIG. 1.

Figure 2:
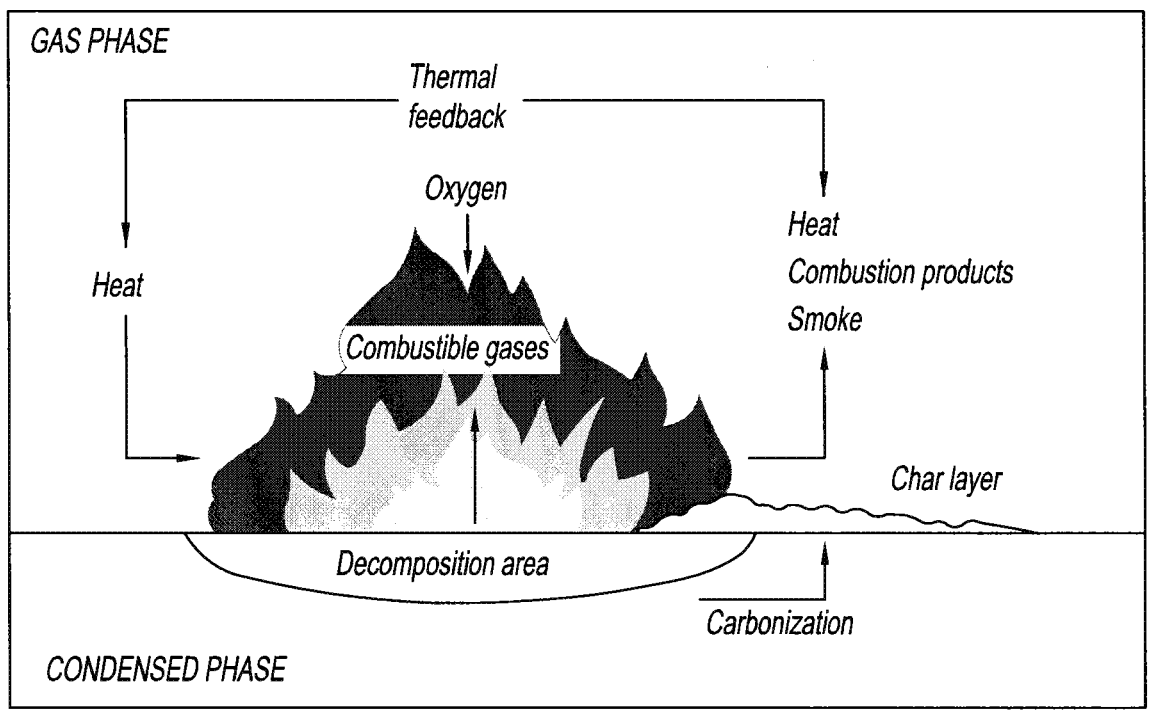
FIG. 2 shows the combustion process.

A flame retardant suppresses or stops the combustion process. Depending on their chemical nature (or composition), flame retardants can act chemically and/or physically in the solid, liquid or gas phases, as shown in FIG. 2.

The fire retardant compositions of this disclosure are substances that reduce the flammability or delay the combustion of another material, typically referred to as a fuel. This effect can be accomplished through physical and/or chemical mechanisms.

These two general classifications of flame retardant mechanisms can by further broken down as physical dilution, chemical interaction, inert gas dilution, thermal quenching, and the formation of protective coatings. Each of these mechanisms is functionally different, but can be combined in the same flame retardant.

The physical dilution mechanism operates by the flame retardant functioning as a thermal sink. This typically increases the heat capacity of the product, allowing it to remain at a lower temperature, preventing ignition.

With physical dilution, the flame retardant additives such as the water soluble ammonium polyphosphate (APP), ammonium dihydrogen phosphate (MAP), and di-ammonium hydrogen phosphate (DAP), upon decomposition, can release inert gases to dilute the fuel in the solid and gaseous phases, and thereby lowering the ignition limit of the combined gas mixture.

Chemical interaction is a mechanism that functions through the generation of free radical species. These species are generated at the flame retardant is consumed, as a product of thermal degradation. These free radicals compete and interfere with the combustion process by reacting in place of oxygen. In addition, in the presence of polymers, these materials can increase the amount of char produced.

With chemical interaction in the gas phase, the free radical mechanism of the combustion process, which takes place in the gas phase, is interrupted by the flame retardant (e.g., halogenated flame retardants such as ammonium bromide). The exothermic processes contributed by the free radicals are thus stopped. Consequently, the supply of new feeding flammable gases reduces, leading to the cooling of the system and eventually, complete flame suppression.

With chemical interaction in the solid phase, the flame retardant, such as the water soluble ammonium polyphosphate (APP), ammonium dihydrogen phosphate (MAP), and di-ammonium hydrogen phosphate (DAP), can cause a layer of carbon to form on the exposed surface of the burning substrate. This can happen, for example, through the dehydrating action of the flame retardant generating double carbon bonds inside the substrate. This leads to the formation of the carbonaceous layer via acidizing and crosslinking.

Inert gas dilution as a mechanism is in some way similar to chemical interaction. Instead of producing free radicals to compete with combustion in place of oxygen, inert gas dilution seeks to disrupt combustion by displacing oxygen. This is accomplished by producing large amount of nonflammable gas during thermal decomposition.

Thermal quenching operates through endothermic degradation of the flame retardant. This effectively cools the product and retards the pyrolysis process.

With thermal quenching, endothermic processes triggered by additives, such as the water soluble ammonium polyphosphate (APP), ammonium dihydrogen phosphate (MAP), and di-ammonium hydrogen phosphate (DAP), cool the substrate to a temperature below that required to sustain the combustion process.

The formation of a protective coating is another method by which fire retardation is possible. During decomposition of the flame retardant, a barrier of liquid material or char is formed, insulting the product to reduce heat transfer. The best example of this mechanism is intumescent systems, which form thick layers of flame resistant foam around a particular product. In addition, phosphate compounds are commonly used. During combustion, many containing compounds decompose to form phosphoric acid. This phosphoric acid in turn polymerizes, creating a glassy layer insulting the product.

With formation of a protective layer or coating, the condensed combustible layer is shielded from the gaseous phase with a solid or gaseous protective layer. Owing to the shielding effects of the protective layer, the heat exchange (or transfer) between the hot gaseous phase and the condensed combustible layer is impeded. With that, the condensed phase underneath gets time to cool down. Smaller amount of pyrolysis gases also get evolved into the gaseous phase. In addition, there is hindered access of the surrounding (or atmospheric) oxygen to reach the condensed combustible layer to continue the combustion. Examples include phosphorus and boron compounds.

In an embodiment, the flame retardant compositions of this disclosure operate through a combination of mechanisms. Each component of a flame retardant formulation may be individually ineffective, but can have a synergistic effect when combined. The flame retardant compositions of this disclosure operate through a combination of several mechanisms including, for example, chemical interaction, thermal quenching, inert gas dilution, and protective coating.

In an embodiment, this disclosure is directed to a composition comprising one or more substrate materials and a flame retardant powder composition. The flame retardant powder composition comprises at least one flame retardant salt, and a nitrogen-containing compound.

In another embodiment, this disclosure is directed to a flame retardant composition comprising at least one flame retardant salt, a nitrogen-containing compound, and water.

In an embodiment, this disclosure is directed to a composition comprising one or more substrate materials and a flame retardant composition. The flame retardant composition comprises from about 10 to about 90 weight percent of at least one flame retardant salt, from about 10 to about 60 weight percent of a nitrogen-containing compound, and optionally from about 1 to about 95 weight percent of water; wherein the entirety of the components is 100 weight percent. The at least one flame retardant salt comprises water soluble ammonium polyphosphate (APP), and the nitrogen-containing compound comprises urea.

In an embodiment, this disclosure is directed to a one or more substrate materials and a flame retardant composition. The flame retardant composition comprises from about 10 to about 90 weight percent of at least one flame retardant salt, from about 10 to about 60 weight percent of a nitrogen-containing compound, and optionally from about 1 to about 95 weight percent of water; wherein the entirety of the components is 100 weight percent. The at least one flame retardant salt comprises water soluble ammonium polyphosphate (APP), ammonium dihydrogen phosphate (MAP), and di-ammonium hydrogen phosphate (DAP); and the nitrogen-containing compound comprises urea.

In an embodiment, this disclosure further is directed to a composition comprising one or more substrate materials and a flame retardant composition. The flame retardant composition comprises from about 10 to about 90 weight percent of at least one flame retardant salt, from about 10 to about 60 weight percent of a nitrogen-containing compound, and optionally from about 1 to about 95 weight percent of water; wherein the entirety of the components is 100 weight percent. The at least one flame retardant salt comprises water soluble ammonium polyphosphate (APP) and ammonium bromide; and the nitrogen-containing compound comprises urea.

For phosphorus-containing flame retardants, the generic mode of action is the formation of a solid charred surface layer of phosphorus compounds and, in specific cases, the interruption of the radical chain process in the gas phase. While halogen containing flame retardants act in the gas phase, phosphorous-containing flame retardants primarily influence the reactions taking place in the condensed phase.

The phosphorus-containing flame retardant is transformed into phosphoric acid by thermal degradation, and water is released from the substrate in the solid phase as shown below.

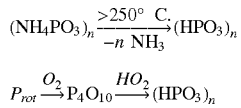

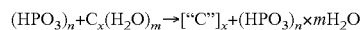

The phosphoric acid forms a protective layer through (a) esterification, and (b) dehydration of the oxygen-containing substrate (i.e., charring). The protective layer consists of interpenetrating networks of carbon and phosphorous oxides as shown below.

$(HPO_3)_n + C_x(H_2O)_m \rightarrow [\text{``C''}]_x + (HPO_3)_n \times mH_2O$

Specific phosphorus flame retardants, such as the metal phosphinates, may also act in the gas phase by the formation of P and PO radicals, which interrupt the radical chain mechanism of the combustion process.

Illustrative phosphorus-containing flame retardants include, for example, resorcinol bis (diphenyl phosphate) (RDP), triaryl phosphates, metal phosphinates, 9,10-dihydro-9-oxa-10-phosphaphenanthrene-10-oxide (DOPO) and its derivatives, trischloropropyl phosphate (TCCP), ammonium polyphosphate (APP), red phosphorous, and the like.

Preferred phosphorus-containing flame retardants of this disclosure include, for example, water soluble ammonium polyphosphate (APP), ammonium dihydrogen phosphate (MAP), and di-ammonium hydrogen phosphate (DAP).

Illustrative di-ammonium hydrogen phosphate (DAP) chemical reactions include, for example, the following:

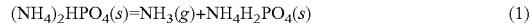 (1)

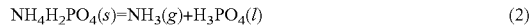 (2)

 (3)

Illustrative ammonium dihydrogen phosphate (MAP) chemical reactions include, for example, the following:

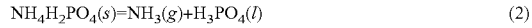 (2)

 (3)

Illustrative water soluble ammonium polyphosphate (APP) chemical reactions include, for example, the following:

 (2)

With regard to the above chemical reactions, the evolution of water absorbs heat, and thereby reduces the transport processes of heat conduction and lowers the flame temperature. $H_3PO_4$ (the phosphorus oxo-acids containing P in oxidation state +5) is a very viscous liquid, which acts as a film on the cellulose fibers, thereby damming and blocking up the issuing pyrolysate. The phosphorus oxo-acid acts as an acid catalyst in the dehydration of carbon-based polyalcohols, such as cellulose in wood. This forms a charred layer over the substrate. The carbonaceous char helps to shield the underlying condensed layer from further attacks by oxygen and radiant heat. The phosphorus oxo-acid reacts with alcohol groups to form heat-unstable phosphate esters. The esters subsequently decompose to release carbon dioxide ($CO_2$), and regenerate the phosphoric acid catalyst. In the gas phase, the release of non-flammable carbon dioxide ($CO_2$) helps to dilute the oxygen of the air and flammable decomposition products of the material that is burning. The solid $P_2O_5$ has the ability of directing cellulose combustion to produce carbon monoxide instead of carbon dioxide as shown below.

$$5C + P_2O_5 = 5CO + 2P \qquad (4)$$

In regard to equation (4), the exothermic reactivity of the system reduces, and this cooling effect hence can be deemed as a fire extinguishing step.

Preferred ammonium salts of phosphoric acid include, for example, mono-ammonium phosphate, diammonium phosphate, ammonium polyphosphate, and the like. The ammonium salt of phosphoric acid can be present in the flame retardant powder composition in an amount from about 10 to about 90 weight percent, preferably from about 15 to about 80 weight percent, and more preferably from about 20 to about 70 weight percent, based on the total weight of the flame retardant powder composition.

Water soluble ammonium polyphosphate is an essential ingredient in the flame retardant compositions of this disclosure. The water soluble ammonium polyphosphate has a total nitrogen as N from about 5 to about 15 weight percent, and a total phosphorus as $P_2O_5$ from about 30 to about 40 weight percent, based on the total weight of the ammonium polyphosphate. The water soluble ammonium polyphosphate has a density from about 1.75 to about 1.90 g/cm³, a water solubility of greater than about 60 g/100 ml, and a pH from about 6.5 to about 8.5.

For bromine-containing and chlorine-containing flame retardants, the generic mode of action is the interruption of the radical chain mechanism of the combustion process in the gas phase. High-energy OH* and H* radicals are formed by chain-branching in the fire as follows:

$$\left. \begin{array}{l} H^* + O_2 \rightarrow OH^* + O^{} \\ O^{} + H_2 \rightarrow OH^* + H^* \end{array} \right\} OH^* \text{ and } H^* \text{ produced in a fire}$$

The high-energy OH* and H* radicals formed by chain-branching in the fire are removed by the halogen-containing flame retardant as follows:

1. Release of halogen radicals (X*=Cl*, or Sr*) from the flame retardant (R—X).

$$R—X \rightarrow R^* + X^*$$

2. Formation of hydrogen halides (HX).

$$HX + H^* \rightarrow H_2 + X^*$$

$$HX + OH^* \rightarrow H_2O + X^*$$

3. Neutralization of energy-rich radicals.

$$HX + H^* \rightarrow H_2 + X^*$$

$$HX + OH^* \rightarrow H_2O + X^*$$

The high-energy H* and OH* radicals are removed from the gas phase by reaction with HX and replaced with low-energy X* radicals. The actual flame effect is thus produced by HX. The hydrogen halide consumed is regenerated by reaction with hydrocarbon as shown below. Thus, HX ultimately acts as a catalyst.

$$X^* + RH \rightarrow R^* + HX$$

Illustrative bromine-containing and chlorine-containing flame retardants include, for example, tetrabromobisphenol A (TBBA) and its derivatives, tetrabromobisphenol acid, decabromdiphenyl ether (deca-BDE), hexabromcyclododecane (HBCDD), chloroparaffins, dedecachloropentacyclooctadecadiene (dechlorane), and the like.

Upon heating, ammonium bromide decomposes into ammonia gas and liquid hydrogen bromide. Illustrative ammonium bromide chemical reactions include, for example, the following:

$$NH_4Br(s) = NH_3(g) + HBr(l)$$

$$HBr(l) \rightarrow HBr(g)$$

$$NH_4Br\ (s) = NH_3\ (g) + HBr\ (l)$$

$$HBr\ (l) \longrightarrow HBr\ (g)$$

$$\left. \begin{array}{l} HBr\ (g) + H^*\ (\text{radical produced in a fire}) \longrightarrow H_2 + Br^* \\ HBr\ (g) + OH^*\ (\text{radical produced in a fire}) \longrightarrow H_2O + Br^* \end{array} \right\}$$

3. Neutralization of energy-rich radicals

Preferred ammonium salts of hydrobromic acid include, for example, ammonium bromide, ammonium chloride, magnesium chloride, and the like. The ammonium salt of hydrobromic acid can be present in the flame retardant powder composition in an amount from about 10 to about 50 weight percent, preferably from about 15 to about 45 weight percent, and more preferably from about 20 to about 40 weight percent, based on the total weight of the flame retardant powder composition.

For nitrogen-containing compounds, the generic mode of action is the release of inert gases (e.g., ammonia and nitrogen) into the gas phase or by condensation reactions in the solid phase.

Illustrative nitrogen-containing compound chemical reactions include, for example, the following:

$$(NH_2)_2CO(s) + H_2O(l) \rightarrow NH_3(g) + H_2CO(l)$$

$$H_2CO_3(l) \rightarrow H_2O(g) + CO_2(g)$$

Urea releases non-combustible gases such as ammonia ($NH_3$), water vapor ($H_2O$) and carbon dioxide ($CO_2$) that dilute combustible gases and lowers the flame temperature in the gas phase. Urea can work in synergy with alum and potassium bicarbonate salts.

Illustrative nitrogen-containing compounds include, for example, guanidine (present in urea), melamine, melamine cyanurate (MC), melamine polyphosphate (MPP)+metal phosphinates (synergy), melamine poly(zinc- or aluminum) phosphates+metal phosphinates (synergy), melamine-based HALS (Hindered Amine Light Stabilizer), and the like.

The preferred nitrogen-containing compound is urea.

The nitrogen-containing compounds (i.e., urea) can be present in the flame retardant powder composition in an amount from about 10 to about 60 weight percent, preferably from about 12 to about 55 weight percent, and more preferably from about 15 to about 50 weight percent, based on the total weight of the flame retardant powder composition.

Illustrative ammonium salts of sulfuric acid include, for example, ammonium sulfate, and the like. The ammonium salt of sulfuric acid can be present in the flame retardant powder composition in an amount from about 10 to about 20 weight percent, preferably from about 11 to about 19 weight percent, and more preferably from about 12 to about 18 weight percent, based on the total weight of the flame retardant powder composition.

Illustrative ammonium salts of hydrochloric acid include, for example, ammonium chloride, and the like. The ammonium salt of hydrochloric acid can be present in the flame retardant powder composition in an amount from about 10 to about 20 weight percent, preferably from about 11 to about 19 weight percent, and more preferably from about 12 to about 18 weight percent, based on the total weight of the flame retardant powder composition.

Other additives can be present in the flame retardant powder composition in an amount from about 0.1 to about 30 weight percent, preferably from about 0.5 to about 25 weight percent, and more preferably from about 1 to about 20 weight percent, based on the total weight of the flame retardant powder composition.

Illustrative of such other additives include, for example, alum (hydrated potassium aluminum sulfate), sodium stannate, sodium or potassium silicate (liquid glass), sodium borate (borax), carboxymethyl cellulose, starch-like compounds (e.g., cassava liquid, sweet potato, tapioca extract, or catalase), organophosphorus nitrogen compounds, glycerin or glycerol, isocyanates, polyurethanes, organosilicones, pentaerythitol, 4A natural zeolite, surfactants (e.g., anionic, cationic, nonionic, and zwitterionic), solvents (e.g., organic solvents such as aromatic compounds, alcohols, esters, ethers, ketones, amines, nitrated hydrocarbons, and halogenated hydrocarbons), and the like.

Carboxymethyl cellulose (CMC) is a cellulose derivative with carboxymethyl groups ($—CH_2—COOH$) bound to some of the hydroxyl groups of the glucopyranose monomers that make up the cellulose backbone. The addition of CMC to flame retardant compositions of this disclosure increases the viscosity of the prepared flame retardant solution. The higher viscosity aids in the pick-up of the flame retardant solution during the padding process. In addition, CMC also acts as a carbonization agent. For every 80 ml of water introduced to prepare the flame retardant solution, add 1-2 ml teaspoon of CMC powder. If a flame retardant solution of higher viscosity is needed, more CMC powder can be added in a later time. The setback of having too much CMC powder is the longer time needed for treated samples to dry under room temperature conditions. Other alternatives to CMC powder are glycerin, PEG (polyethylene glycol) 400 and PVA (polyvinyl alcohol), and the like.

Borax (also known as sodium borate, sodium tetraborate, or disodium tetraborate) is an important boron compound, a mineral, and a salt of boric acid. Powdered borax is white, consisting of soft colorless crystals that dissolve in water. In accordance with this disclosure, the decahydrate version of borax, i.e., $Na_2B_4O_7.10H_2O$, is preferred. Borax is a flame retardant additive. In accordance with this disclosure, 5-20 wt % of borax can be added into the flame retardant composition before making a flame retardant solution. If 20 wt % of borax is used, water needs to be heated (about 60° C.-90° C.) to facilitate the dissolution of borax crystals. Borax imparts the added benefit of slowing the spread of surface flames if burning occurs. This is attributed to char-formation, low melting point and glassy film formation, which help to block volatile compounds from reaching the flames. Borax is low cost and has minimal impact on the substrate's physical properties. In addition, borax releases water in high quantities which cools down combustion temperature and evolution of water vapor that dilutes combustible gases. Other benefits of borax include, for example, it acts as an anti-corrosive protecting metals in cellulosic materials; suppresses glowing, smoldering and smoke; and plays synergistic value with other fire retardants.

Sodium (or potassium) silicate is also known as liquid glass—$Na_2(SiO_2)_nO$ or $Na_2SiO_3.nH_2O$. In accordance with this disclosure, the nono hydrate version, i.e., $Na_2SiO_3.9H_2O$, is preferred. Sodium silicate is a flame retardant additive that is soluble in water. In accordance with this disclosure, 5-20 wt % of sodium silicate can be added into the flame retardant composition before making a flame retardant solution. If 20 wt % of sodium silicate is used, water needs to be heated (about 60° C.-90° C.) to facilitate the dissolution of silicate crystals. Upon combustion, sodium silicate forms a glassy layer that insulates and prevents oxygen from reaching the substrate. Sodium silicates are inherently intumescent. Treated samples should be waterproofed to ensure long-term passive fire protection (PFP). When sodium silicates are adequately protected, they function extremely well and reliably for long periods. Sodium silicate, both in bead form and in liquid form, are inherently endothermic, due to the liquid water in the water glass that undergoes hydrolysis. Potassium silicate functions in a similar way to sodium silicate.

Glycerin (or glycerol, $C_3H_8O_3$), is a simple polyol compound. It is a colorless, odorless, viscous liquid that is sweet-tasting and non-toxic. Glycerol has three hydroxyl groups that are responsible for its solubility in water. In accordance with this disclosure, 10-20 wt % of glycerin can be added during the preparation of the flame retardant solution that contains borax and sodium silicate. Glycerin promotes the dissolution of borax and sodium silicate in water at room temperature. If the flame retardant solution does not contain borax and/or sodium silicate, 0.5-1.0 wt % glycerin can also be added to suppress glowing, smoldering and smoke when burning occurs.

Isocyanates, which are organic compounds containing the functional group with the formula R—N=C=O, are useful additives. Isocyanates are electrophiles, and as such they are reactive toward a variety of nucleophiles including alcohols, amines, and even water. Upon treatment with an alcohol (e.g., glycerin, PEG 400, PVA and PER), an isocyanate forms a urethane linkage (shown below):

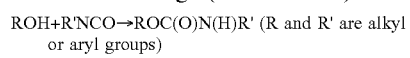
(R and R' are alkyl or aryl groups)

An isocyanate that has two isocyanate groups is known as a di-isocyanate. If a di-isocyanate is treated with a compound containing two or more hydroxyl groups, such as a diol or a polyol (e.g., glycerin, PEG 400, PVA and PER), polymer chains are formed, which are known as polyurethanes. Isocyanates also react with water to form carbon dioxide (shown below):

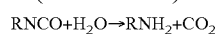

The polyurethanes crosslink and bind the water-soluble flame retardant composition to the substrate, thereby making the flame retardant composition stay intact after laundering. The recommended amount of isocyanates to be added will be in the range of 10-30% of the flame retardant composition powder wt %.

Organosilicones (e.g., n-octyltriethoxysilane, $CH_{14}H_{32}O_3Si$), are used to introduce water-proof protection to the flame retardant composition coat. Another alternative is potassium methyl siliconate (e.g., $CH_3K_3O_3Si$). Basically, a crosslinking reaction happens between the Si—OH in the flame retardant coating and the Si—OH in the organosilicones and/or potassium methyl siliconate under hydrolysis. The end result leads to the formation of an excellent waterproof layer. The recommended amount of organosilicones and/or potassium methyl siliconate to be added will be in the range of 0.5-1.0 wt % of the flame retardant solution.

Pentaerythitol (PER, $C_5H_{12}O_4$), is an organic compound, a white, crystalline solid. It is a polyol, with the neopentane backbone and one hydroxyl group in each of the four terminal carbons. It is a building block for the synthesis and production of explosives, plastics, appliances, and many other important chemicals. It can serve as a carbonization agent. The recommended dosage is 1.0-4.0 wt % of the flame retardant powder.

4A natural zeolite is a halogen-free intumescent flame retardant additive. Another substitute is apatite. The recommended dosage is 1.0-60 wt % of the flame retardant powder.

The surfactant can be an anionic, cationic, nonionic, or zwitterionic surfactant. The surfactant may act as a detergent, wetting agent, emulsifier, foaming agent, dispersant, adsorbent, and the like. Illustrative surfactants useful in the compositions of this disclosure include, for example, polyalkylene glycols, and the like. The recommended amount of surfactant to be added will be in the range of 0.5-5.0 wt % of the flame retardant solution.

The solvent can be any solvent suitable for use in the compositions of this disclosure. Illustrative solvents include, for example, organic solvents such as an aromatic compound, alcohol, ester, ether, ketone, amine, nitrated hydrocarbon, halogenated hydrocarbon, and the like. The recommended amount of solvent to be added will be in the range of 1-10 wt % of the flame retardant solution.

The substrate material can be present in an amount from about 5 weight percent to about 95 weight percent, preferably from about 10 to about 90 weight percent, and more preferably form about 25 to about 75 weight percent, based on the total weight of the substrate material/flame retardant composition. The flame retardant composition is present in an amount from about 5 weight percent to about 95 weight percent, preferably from about 10 to about 90 weight percent, and more preferably form about 25 to about 75 weight percent, based on the total weight of the substrate material/flame retardant composition.

In an embodiment, this disclosure is directed to a process for preparing a flame retardant powder composition. The process comprises adding to a container at least one flame retardant salt and a nitrogen-containing compound, and mixing the contents of the container to give a dispersed mixture comprising the flame retardant powder composition.

Processing conditions for the preparation of the flame retardant powder compositions of this disclosure, such as temperature, pressure and mix time, may also vary greatly and any suitable combination of such conditions may be employed herein. Normally the process is carried out under ambient temperature, ambient pressure and the mix time may vary from a matter of seconds or minutes to a few hours or greater. The ingredients can be added to the mixture or combined in any order. The mix time employed can range from about 0.1 to about 10 hours, preferably from about 0.25 to 8 hours, and more preferably from about 0.5 to 4 hours, for all steps.

In an embodiment, this disclosure is also directed to a composition comprising one or more substrate materials and a flame retardant composition. The flame retardant composition comprises at least one flame retardant salt, a nitrogen-containing compound, and water.

In an embodiment, this disclosure is directed to a process for preparing a flame retardant water based composition. The process comprises adding to a container at least one flame retardant salt, a nitrogen-containing compound, and water; and mixing the contents of the container to give a dissolved solution comprising the flame retardant water based composition.

Processing conditions for the preparation of the flame retardant water based compositions of this disclosure, such as temperature, pressure and mix time, may also vary greatly and any suitable combination of such conditions may be employed herein. Normally the process is carried out under ambient temperature, ambient pressure and the mix time may vary from a matter of seconds or minutes to a few hours or greater. The ingredients can be added to the mixture or combined in any order. The mix time employed can range from about 0.1 to about 10 hours, preferably from about 0.25 to 8 hours, and more preferably from about 0.5 to 4 hours, for all steps.

In accordance with this disclosure, an intumescent process is provided for forming an insulating protective layer on a substrate. The process comprises: (a) providing a flame retardant composition comprising at least one flame retardant salt, a nitrogen-containing compound, and optionally water, in which the at least one flame retardant salt comprises an ammonium salt of phosphoric acid, and the nitrogen-containing compound comprises urea; (b) heating the ammonium salt of phosphoric acid to give an inorganic acid; (c) carbonizing the inorganic acid with a polyalcohol present in the substrate; (d) hydrolyzing urea to give ammonia and reacting ammonia to give nitrogen gas; (e) foaming the mixture of the carbonized inorganic acid and the nitrogen gas; and (f) solidifying the foam through one or more cross linking reactions to form the insulating protective layer on the substrate.

Intumescence is the formation of a voluminous insulating protective layer through carbonization and simultaneous foaming. Intumescent FR systems 'puff up' to produce foams They are used to protect combustible materials such as plastics or wood, and those like steel, which lose their strength when exposed to high temperatures, against the attack of heat and fire.

Basically, intumescent flame retardant systems consist of the following three things: (i) "carbon" donors (e.g., polyalcohols which are present in cotton, wood and paper), (ii) acid donors (e.g., ammonium polyphosphate), and (iii) gas producing compounds (e.g., urea, APP, $P_2O_5$).

In particular, the intumescent process mechanism includes the following:

1. Release of an inorganic acid (e.g., ammonium polyphosphate or APP)

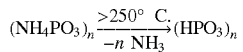

2. Carbonization (e.g., of polyalcohols)

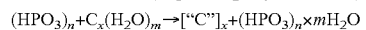

3. Gas formation

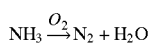

4. Foaming of the mixture

5. Solidification Through Crosslinking Reactions

In an embodiment, this disclosure provides a process for the production of an extruded article. The process comprises heating a polymer to form a polymer melt, adding a flame retardant powder composition to the polymer melt to form a flame retardant polymer melt, and extruding the flame retardant polymer melt to give an extruded article. The flame retardant composition comprises at least one flame retardant salt and a nitrogen-containing compound.

Illustrative flame retardant powder compositions are described herein. Illustrative polymers include, for example, thermoplastic polymers and thermosets.

Illustrative thermoplastic polymers include, for example, the following:

(1) Polymers of monoolefins and diolefins, for example, polypropylene, polyisobutylene, poly-but-1-ene, poly-4-methylpent-1-ene, polyvinylcyclohexane, polyisoprene or polybutadiene, as well as polymers of cycloolefins, for instance of cyclopentene or norbornene, polyethylene (which optionally can be cross linked), for example, high density polymethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE). Polyolefins, i.e., the polymers of monoolefins exemplified in the preceding paragraph, preferably polyethylene and polypropylene, can be prepared by different and especially by the following methods:

(a) Radical polymerization (normally under high pressure and at elevated temperature).

(b) Catalytic polymerization using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-bond coordinated. These metal complexes may be in the free form or fixed on substrates, typically on activated magnesium chloride, titanium (III) chloride, alumina or silicon oxide. These catalysts may be soluble or insoluble in the polymerization medium. The catalysts can be used by themselves in the polymerization or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, and amine or silyl ether groups.

(2) Mixtures of the polymers mentioned under (1), for example, mixtures of polypropylene with polyisobutylene, polypropylene with polyethylene (for example, PP/HDPE, PP/LDPE) and mixtures of different types of polyethylene (for example, LDPE/HDPE).

(3) Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g., ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in (1) above, for example polypropylene/ethylene-propylene copolymers, LDPE/-ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

(4) Hydrocarbon resins (for example $C_5$-$C_9$) including hydrogenated modifications thereof (e.g., tackifiers) and mixtures of polyalkylenes and starch. The homopolymers and copolymers mentioned above may have a stereo structure including syndiotactic, isotactic, hemi-isotactic or atactic; where atactic polymers are preferred. Stereo block polymers are also included.

(5) Polystyrene, poly(p-methylstyrene), poly(α-methylstyrene).

(6) Aromatic homopolymers and copolymers derived from vinyl aromatic monomers including styrene, .alpha.-methylstyrene, all isomers of vinyl toluene, especially p-vinyl toluene, all isomers of ethyl styrene, propyl styrene, vinyl biphenyl, vinyl naphthalene, and vinyl anthracene, and mixtures thereof. Homopolymers and copolymers may have a stereo structure including syndiotactic, isotactic, hemi-isotactic or atactic; where atactic polymers are preferred. Stereo block polymers are also included;

(a) Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

(b) Hydrogenated aromatic polymers derived from hydrogenation of polymers mentioned under (6), especially including polycyclohexylethylene (PCHE) prepared by hydrogenating atactic polystyrene, often referred to as polyvinylcyclohexane (PVCH).

(c) Hydrogenated aromatic polymers derived from hydrogenation of polymers mentioned under (6a). Homopolymers and copolymers may have a stereo structure including syndiotactic, isotactic, hemi-isotactic or atactic; where atactic polymers are preferred. Stereo block polymers are also included.

(7) Graft copolymers of vinyl aromatic monomers such as styrene or .alpha.-methylstyrene, for example, styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under (6), for example the copolymer mixtures known as ABS, MBS, ASA or AES polymers.

(8) Halogen-containing polymers such as polychloroprene, chlorinated rubbers, chlorinated and brominated copolymer of isobutylene-isoprene (halobutyl rubber), chlorinated or sulphochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

(9) Polymers derived from α, β-unsaturated acids and derivatives thereof such as polyacrylates and polymethacrylates; polymethyl methacrylates, polyacrylamides and polyacrylonitriles, impact-modified with butyl acrylate.

(10) Copolymers of the monomers mentioned under (9) with each other or with other unsaturated monomers, for example, acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

(11) Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1 above.

(12) Homopolymers and copolymers of cyclic ethers such as polyalkylene glycols, polyethylene oxide, polypropylene oxide or copolymers thereof with bisglycidyl ethers.

(13) Polyacetals such as polyoxymethylene and those polyoxymethylenes, which contain ethylene oxide as a comonomer; polyacetals modified with thermoplastic polyurethanes, acrylates or MBS.

(14) Polyphenylene oxides and sulphides, and mixtures of polyphenylene oxides with styrene polymers or polyamides.

(15) Polyurethanes derived from hydroxyl-terminated polyethers, polyesters or polybutadienes on the one hand and aliphatic or aromatic polyisocyanates on the other, as well as precursors thereof.

(16) Polyamides and co-polyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or co-polyamides modified with EPDM or ABS; and polyamides condensed during processing (RIM polyamide systems).

(17) Polyureas, polyimides, polyamide imides, polyether imides, polyester imides, polyhydantoins and polybenzimidazoles.

(18) Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block co-polyether esters derived from hydroxyl-terminated polyethers; and also polyesters modified with polycarbonates or MBS.

(19) Polyketones.

(20) Polysulphones, polyether sulphones and polyether ketones.

(21) Blends of the aforementioned polymers (polyblends), for example, PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

(22) Polycarbonates, for example, that are obtainable by interfacial processes or by melt processes (catalytic transesterification). The polycarbonate may be either branched or linear in structure and may include any functional substituents. Polycarbonate copolymers and polycarbonate blends are also within the scope of this disclosure. The term polycarbonate should be interpreted as inclusive of copolymers and blends with other thermoplastics. Methods for the manufacture of polycarbonates are known, for example, from U.S. Pat. Nos. 3,030,331; 3,169,121; 4,130,458; 4,263,201; 4,286,083; 4,552,704; 5,210,268; and 5,606,007. A combination of two or more polycarbonates of different molecular weights may be used. Preferred are polycarbonates obtainable by reaction of a diphenol, such as bisphenol A, with a carbonate source. The carbonate source may be a carbonyl halide, a carbonate ester or a haloformate. Suitable carbonate halides are phosgene or carbonylbromide. Suitable carbonate esters are dialkylcarbonates, such as dimethyl- or diethylcarbonate, diphenyl carbonate, phenyl-alkylphenylcarbonate, such as phenyl-tolylcarbonate, dialkylcarbonates, such as dimethyl- or diethylcarbonate, di-(halophenyl)carbonates, such as di-(chlorophenyl)carbonate, di-(bromophenyl)carbonate, di-(trichlorophenyl) carbonate or di-(trichlorophenyl)carbonate, di-(alkylphenyl) carbonates, such as di-tolylcarbonate, naphthylcarbonate, dichloro-naphthylcarbonate and others. The polymer substrate mentioned above, which comprises polycarbonates or polycarbonate blends is a polycarbonate-copolymer, wherein isophthalate/terephthalate-resorcinol segments are present. Such polycarbonates are commercially available. Other polymeric substrates of component b) may additionally contain in the form as admixtures or as copolymers a wide variety of synthetic polymers including polyolefins, polystyrenes, polyesters, polyethers, polyamides, poly (meth)acrylates, thermoplastic polyurethanes, polysulphones, polyacetals and PVC, including suitable compatibilizing agents. For example, the polymer substrate may additionally contain thermoplastic polymers selected from the group of resins consisting of polyolefins, thermoplastic polyurethanes, styrene polymers and copolymers thereof. Specific embodiments include polypropylene (PP), polyethylene (PE), polyamide (PA), polybutylene terephthalate (PBT), polyethylene terephthalate (PET), glycol-modified polycyclohexylenemethylene terephthalate (PCTG), polysulphone (PSU), polymethylmethacrylate (PMMA), thermoplastic polyurethane (TPU), acrylonitrile-butadiene-styrene (ABS), acrylonitrile-styrene-acrylic ester (ASA), acrylonitrile-ethylene-propylene-styrene (AES), styrene-maleic anhydride (SMA) or high impact polystyrene (HIPS).

(23) Epoxy resins consisting of di- or polyfunctional epoxide compounds.

Suitable hardener components are, for example, amine and anhydride hardeners such as polyamines, e.g., ethylenediamine, diethylenetriamine, triethylenetriamine, hexamethylenediamine, methanediamine, N-aminoethyl piperazine, diaminodiphenylmethane [DDM], alkyl-substituted derivatives of DDM, isophoronediamine [IPD], diaminodiphenylsulphone [DDS], 4,4'-methylenedianiline [MDA], or m-phenylenediamine [MPDA]), polyamides, alkyl/alkenyl imidazoles, dicyandiamide [DICY], 1,6-hexamethylene-bis-cyanoguanidine, or acid anhydrides, e.g. dodecenylsuccinic acid anhydride, hexahydrophthalic acid anhydride, tetrahydrophthalic acid anhydride, phthalic acid anhydride, pyromellitic acid anhydride, and derivatives thereof.

As described herein, the flame-retardant compositions of this disclosure can be processed via mixing to incorporate the flame retardant composition of this disclosure into the polymer melt and then extrusion and pelletization to give pellets as products.

After thoroughly drying the pellets fabricated by the above-mentioned method to eliminate moisture, injection molding can be carried out according to the following method.

That is to say, there is no particular limitation on the injection molding method, and it suffices that injection molding methods, such as, representatively, general injection molding method for thermoplastic resin, gas assist molding method, and injection compression molding method, can be adopted. In addition to the methods mentioned above, in-mold method, gas press molding method, two-color molding method, sandwich molding method, and the like can also be adopted according to other purposes.

The injection molding device can be constructed from a general injection-molding machine, a gas assist molding machine, an injection compression molding machine, and the like, and a molding die and auxiliary instruments, a mold temperature regulator and a source materials drier, and the like that are used therefor; however, it is not limited to such constructions.

For molding conditions, it is preferred to carry out molding with a molten resin temperature in the range of 170° C. to 210° C. to avoid thermal decomposition of the resin inside the injection cylinder.

If the injection molded article is to be obtained in a non-crystalline state, it is preferred that the mold temperature be as low a temperature as possible from the perspective of shortening the cooling time in the molding cycle (mold closing, injection, packing-holding, cooling, mold opening, and release). In general, 15° C. to 55° C. is desirable, as well as the use of a chiller. However, a temperature range of 20° C. to 40° C. is advantageous from the perspective of preventing contraction, warp, and deformation of the molded article.

It is effective to carry out crystallization by heating to further increase the heat resistance of the molded article obtained by injection molding.

Examples of crystallization methods include methods wherein injection molding is carried out in a mold whose temperature was raised previously and crystallization is carried out inside the mold, methods wherein the temperature of the mold is raised after injection molding to carry out crystallization inside the mold, or methods wherein, after releasing the injection molded article in a non-crystalline state, crystallization is carried out with hot air, vapor, hot water, a far-infrared radiation heater, an IH heater, and the like. In so doing, the injection molded article need not be immobilized; however, to prevent deformation of the molded article, it is preferred to immobilize the article with a metal mold, a resin mold, and the like. In addition, taking productivity into consideration, heating can also be carried out in a packaged state.

To carry out crystallization inside the mold, it is preferred that the interior of a heated mold be filled with molten resin, which is then held inside the mold for a given time period.

In so doing, the mold temperature is from 80° C. to 130° C., and preferably from 90° C. to 120° C.; the cooling time is from 1 to 300 seconds, and preferably from 5 to 30 seconds. The heat resistance of the injection molded article according to the present embodiment can be further increased by carrying out crystallization inside the mold with such temperature and cooling time.

If crystallization is to be carried out after releasing the molded article from the mold, the heating temperature is preferably in the range of 60° C. to 130° C., and more preferably in the range of 70° C. to 90° C. If the heating temperature is lower than 60° C., there is the possibility that crystallization does not proceed in the molding process, and if it is greater than 130° C., there is the possibility that a deformation and a contraction occur during cooling of the molded article.

It is preferred that the heating time be suitably determined according to the composition and heating temperature. For instance, it is preferred that at 70° C., heating be carried out for 15 minutes to 5 hours. At 130° C., it is preferred that heating be carried out for 10 seconds to 30 minutes.

The injection molded articles not only have excellent flame-retardant properties, but also combine excellent impact resistance and heat resistance. That is to say, these injection molded articles have the properties of not less than 5 kJ/m$^2$, preferably not less than 10 kJ/m$^2$ Izod impact strength according to JIS K 7110 (ASTM D256), not less than 50° C., preferably not less than 55° C. deflection temperature under load according to JIS K 7191 (ASTM D648), and not less than V-2 flame retardant rating according to UL94 vertical firing test.

As the flame retardant injection molded articles described herein not only have excellent flame-retardant properties, but also combine excellent impact resistance and heat resistance, they can be used as construction materials, home appliance products, office equipment, automotive parts, and other general molded articles, and, in particular, they can also be used in applications requiring heat resistance.

In another embodiment, the flame retardant compositions of this disclosure comprising a polymer and a flame retardant composition can be foamed or unfoamed compositions.

Examples of polymers that can be used are foamed or unfoamed styrene polymers, including ABS, ASA, SAN, AMSAN, polyesters, polyimides, polysulfones, polyolefins, such as polyethylene and polypropylene, polyacrylates, polyether ether ketones, polyurethanes, polycarbonates, polyphenylene oxides, unsaturated polyester resins, phenolic resins, polyamides, polyether sulfones, polyether ketones, and polyether sulfides, respectively individually or in a mixture in the form of polymer blends.

Preference is given to foamed or unfoamed styrene homopolymers and foamed or unfoamed styrene copolymers, respectively individually or in a mixture in the form of polymer blends.

The density of the flame-retardant polymer foams is preferably in the range from 5 to 150 kg/m$^3$, particularly preferably in the range from 10 to 50 kg/m$^3$. The closed-cell content of the foams is preferably more than 80%, particularly preferably from 90 to 100%.

The flame-retardant, expandable styrene polymers (EPS) and extruded styrene polymer foams (XPS) of this disclosure can be processed via mixing to incorporate a blowing agent and the flame retardant of this disclosure into the polymer melt and then extrusion and pelletization under pressure to give expandable pellets (EPS), or via extrusion and depressurization, using appropriately shaped dies, to give foam sheets (XPS) or foam extrudates.

The molar mass Mw of expandable styrene polymers is preferably in the range from 120 000 to 400 000 g/mol, particularly preferably in the range from 180 000 to 300 000 g/mol, measured by means of gel permeation chromatography with refractiometric detection (RI) against polystyrene standards. The molar mass of the expandable polystyrene is generally below the molar mass of the polystyrene used by about 10 000 g/mol, because of the molar mass degradation due to shear and/or the effect of temperature.

Styrene polymers preferably used comprise glassclear polystyrene (GPPS), high-impact polystyrene (HIPS), anionically polymerized polystyrene or high-impact polystyrene (AIPS), styrene-alpha-methylstyrene copolymers, acrylonitrile-butadiene-styrene polymers (ABS), styrene-acrylonitrile copolymers (SAN), acrylonitrile-alpha-methylstyrene copolymers (AMSAN), acrylonitrile-styrene-acrylate (ASA), methyl acrylate-butadiene-styrene (MBS), methyl methacrylate-acrylonitrile-butadiene-styrene (MABS) polymers, or a mixture thereof, or a mixture with polyphenylene ether (PPE).

In order to improve mechanical properties or thermal stability, the styrene polymers mentioned may be blended with thermoplastic polymers, such as polyamides (PA), polyolefins, such as polypropylene (PP) or polyethylene (PE), polyacrylates, such as polymethyl methacrylate (PMMA), polycarbonate (PC), polyesters, such as polyethylene terephthalate (PET) or polybutylene terephthalate (PBT), polyether sulfones (PES), polyether ketones or polyether sulfides (PES) or a mixture of these, generally in total proportions of up to a maximum of 30% by weight, preferably in the range from 1 to 10% by weight, based on the polymer melt, optionally with use of compatibilizers. Mixtures within the ranges of amounts mentioned are also possible with, by way of example, hydrophobically modified or functionalized polymers or oligomers, rubbers, such as polyacrylates or polydienes, e.g., styrene-butadiene block copolymers, or biodegradable aliphatic or aliphatic/aromatic copolyesters.

Examples of suitable compatibilizers are maleic-anhydride-modified styrene copolymers, polymers containing epoxy groups, and organosilanes.

The styrene polymer melt comprising blowing agent generally comprises one or more blowing agents homogeneously distributed in a total proportion of from 2 to 10% by weight, preferably from 3 to 7% by weight, based on the styrene polymer melt comprising blowing agent. Suitable blowing agents are the physical blowing agents usually used in EPS, such as aliphatic hydrocarbons having from 2 to 7 carbon atoms, alcohols, ketones, ethers, or halogenated hydrocarbons. Preference is given to use of isobutane, n-butane, isopentane, n-pentane. For XPS, it is preferable to use $CO_2$ or a mixture thereof with alcohols and/or with $C_2$-$C_4$ carbonyl compounds, in particular with ketones.

To improve foamability, finely dispersed droplets of internal water may be introduced into the styrene polymer matrix. An example of the method for this is the addition of water into the molten styrene polymer matrix. The location of addition of the water may be upstream of, together with, or downstream of, the blowing agent feed. Homogeneous distribution of the water may be achieved by using dynamic or static mixers. An adequate amount of water, based on the styrene polymer, is generally from 0 to 2% by weight, preferably from 0.05 to 1.5% by weight.

The amount added of blowing agent and of water is selected in such a way that the expansion capability a of the expandable styrene polymers (EPSs), defined as bulk density prior to foaming/bulk density after foaming, is at most 125, preferably from 15 to 100.

The bulk density of the expandable styrene polymer pellets (EPSs) is generally at most 700 g/l, preferably in the range from 590 to 660 g/l. If fillers are used, bulk densities in the range from 590 to 1200 g/l may arise, depending on the nature and amount of the filler.

Additives, nucleating agents, fillers, plasticizers, soluble and insoluble inorganic and/or organic dyes and pigments, e.g. athermanous substances, i.e., IR absorbers, such as carbon black, graphite or aluminum powder may moreover be added, together or with spatial separation, to the styrene polymer melt, e.g. by way of mixers or ancillary extruders. The amounts added of the dyes and pigments are generally in the range from 0.01 to 30 parts by weight, preferably in the range from 1 to 5 parts by weight. For homogeneous and microdisperse distribution of the pigments within the styrene polymer, it can be advantageous, particularly in the case of polar pigments, to use a dispersing agent, e.g., organosilanes, polymers containing epoxy groups, or maleic-anhydride-grafted styrene polymers. Preferred plasticizers are mineral oils and phthalates, which may be used in amounts of from 0.05 to 10 parts by weight, based on the styrene polymer.

To produce the expandable styrene polymers, the blowing agent can be incorporated by mixing into the polymer melt. One possible process comprises the following stages: a) melt production, b) mixing, c) cooling, d) transport, and e) pelletizing. Each of these stages may be executed using the apparatus or combinations of apparatus known from plastics processing. Static or dynamic mixers, such as extruders, are suitable for this mixing process. The polymer melt may be taken directly from a polymerization reactor, or produced directly in the mixing extruder, or in a separate melting extruder via melting of polymer pellets. The cooling of the melt may take place in the mixing assemblies or in separate coolers. Examples of pelletizers which may be used are pressurized underwater pelletizers, a pelletizer with rotating knives and cooling via spray-misting of temperature-control liquids, or pelletizers involving atomization. Examples of suitable arrangements of apparatus for carrying out the process are: a) polymerization reactor-static mixer/cooler-pelletizer, b) polymerization reactor-extruder-pelletizer, c) extruder-static mixer-pelletizer, and d) extruder-pelletizer.

The arrangement may also have ancillary extruders for introducing additives, e.g., solids or heat-sensitive additives.

The temperature of the styrene polymer melt comprising blowing agent when it is passed through the die plate is generally in the range from 140 to 300° C., preferably in the range from 160 to 240° C. There is no need for cooling down to the region of the glass transition temperature.

The die plate is heated at least to the temperature of the polystyrene melt comprising blowing agent. It is preferable that the temperature of the die plate is in the range from 20 to 100° C. above the temperature of the polystyrene melt comprising blowing agent. This prevents polymer deposits within the dies and provides problem-free pelletization.

In order to obtain marketable pellet sizes, the diameter (D) of the die holes at the exit from the die should be in the range from 0.2 to 1.5 mm, preferably in the range from 0.3 to 1.2 mm, particularly preferably in the range from 0.3 to 0.8 mm. This permits controlled setting of pellet sizes below 2 mm, in particular in the range from 0.4 to 1.4 mm, even after die swell.

An illustrative process involves the following steps for the production of expandable styrene polymers (EPS) rendered flame-retardant: a) mixing to incorporate an organic blowing agent and from 1 to 25% by weight of the flame retardant composition of this disclosure into the polymer melt by means of a static or dynamic mixer at a temperature of at least 150° C., b) cooling of the styrene polymer melt comprising blowing agent to a temperature of at least 120° C., c) discharge through a die plate with holes, the diameter of which at the exit from the die is at most 1.5 mm, and d) pelletization of the melt comprising blowing agent directly behind the die plate under water at a pressure in the range from 1 to 20 bar.

It is also possible to produce the expandable styrene polymers (EPS) via suspension polymerization in aqueous suspension in the presence of the flame retardant composition of this disclosure and of an organic blowing agent.

The usual auxiliaries can be added during the suspension polymerization process, examples being peroxide initiators, suspension stabilizers, blowing agents, chain-transfer agents, expansion aids, nucleating agents, and plasticizers. The amounts of flame retardant composition of this disclosure added in the polymerization process are from 0.5 to 25% by weight, preferably from 5 to 15% by weight. The amounts of blowing agents added are from 3 to 10% by weight, based on monomer. These amounts can be added prior to, during, or after polymerization of the suspension. Examples of suitable blowing agents are aliphatic hydrocarbons having from 4 to 6 carbon atoms. It is advantageous to use inorganic Pickering dispersants as suspension stabilizers, an example being magnesium pyrophosphate or calcium phosphate.

The suspension polymerization process can produce bead-shaped particles which are in essence round, with average diameter in the range from 0.2 to 2 mm.

In order to improve processability, the finished expandable styrene polymer pellets can be coated with glycerol ester, antistatic agent, or anticaking agent.

The EPS pellets can be coated with glycerol monostearate GMS (typically 0.25%), glycerol tristearate (typically 0.25%), fine-particle silica (typically 0.12%), or Zn stearate (typically 0.15%), or else antistatic agent.

The expandable styrene polymer pellets can be prefoamed in a first step by means of hot air or steam to give foam beads with density in the range from 5 to 150 kg/m$^3$, in particular from 10 to 50 kg/m$^3$, and can be fused in a second step in a closed mold, to give molded particles.

The expandable polystyrene particles can be processed to give polystyrene foams with densities of from 8 to 150 kg/m$^3$, preferably from 10 to 50 kg/m$^3$ (measured to ISO 845). To this end, the expandable beads are prefoamed. This is mostly achieved by heating of the beads, using steam in what are known as prefoamers. The resultant prefoamed beads are then fused to give moldings. To this end, the prefoamed beads are introduced into molds which do not have a gas-tight seal, and are treated with steam. The moldings can be removed after cooling.

In another embodiment, the foam is an extruded polystyrene (XPS), obtainable via: a) heating of a polymer component to form a polymer melt, b) introduction of a blowing agent component into the polymer melt to form a foamable melt, c) extrusion of the foamable melt into a region of relatively low pressure with foaming to give an extruded foam, and d) addition of the flame retardant composition of this disclosure and also, optionally, of further auxiliaries and additives, in at least one of the steps a) and/or b).

Foams based on styrene polymers, in particular EPS and XPS, are suitable by way of example for use as insulation materials, in particular in the construction industry.

As described above, the compositions according to this disclosure may additionally contain one or more conventional additives, for example selected from pigments, dyes, plasticizers, antioxidants, surfactants, adsorbents, binders, suppressants, detergents, dispersants, wetting agents, emulsifiers, foaming agents, viscosity modifiers, corrosion inhibitors, thixotropic agents, leveling assistants, basic co-stabilizers, metal passivators, metal oxides, organophosphorus compounds, further light stabilizers and mixtures thereof, especially pigments, phenolic antioxidants, calcium stearate, zinc stearate, UV absorbers of the 2-hydroxy-benzophenone, 2-(2'-hydroxyphenyl)benzotriazole and/or 2-(2-hydroxyphenyl)-1,3,5-triazine groups.

Illustrative pigments useful in the compositions of this disclosure include, for example, inorganic or organic colorants, and the like. The recommended amount of pigment to be added will be in the range of 0.1-5.0 wt % of the composition.

Illustrative dyes useful in the compositions of this disclosure include, for example, inorganic or organic colorants, and the like. The recommended amount of dye to be added will be in the range of 0.1-5.0 wt % of the flame retardant solution.

Illustrative plasticizers useful in the compositions of this disclosure include, for example, diorganic phthatate, and the like. The recommended amount of plasticizer to be added will be in the range of 0.1-12 wt % of the flame retardant solution.

Illustrative antioxidants useful in the compositions of this disclosure include, for example, gloathione, and the like. The recommended amount of antioxidant to be added will be in the range of 0.1-12 wt % of the flame retardant solution.

Illustrative surfactants useful in the compositions of this disclosure include, for example, alkylbenzene sulfonate, polyalkylene glycol, and the like. The recommended amount of surfactant to be added will be in the range of 0.5-12 wt % of the composition.

Illustrative adsorbents useful in the compositions of this disclosure include, for example, alumina silicate, and the like. The recommended amount of adsorbent to be added will be in the range of 0.1-15.0 wt % of the flame retardant solution.

Illustrative binders useful in the compositions of this disclosure include, for example, copolymers of isocyanates, casein, and the like. The recommended amount of binder to be added will be in the range of 10-30 wt % of the flame retardant solution.

Illustrative smoke suppressants useful in the compositions of this disclosure include, for example, zinc molybdate, calcium zinc molybdate, zinc oxide/phosphate complexes, and the like. The recommended amount of suppressant to be added will be in the range of 0.1-5.0 wt % of the flame retardant solution.

Illustrative detergents useful in the compositions of this disclosure include, for example, alkybenzene sulfonates, and the like. The recommended amount of detergent to be added will be in the range of 0.1-8.0 wt % of the flame retardant solution.

Illustrative dispersants useful in the compositions of this disclosure include, for example, sulfate, sulfonate, and phosphate esters, carboxylates, cationic head groups, Zwitterionic surfactants, ethoxylates, fatty acid esters of polyhydroxy compounds, amine oxides, sulfoxides, phosphine oxides, and the like. The recommended amount of dispersant to be added will be in the range of 0.1-6.0 wt % of the flame retardant solution.

Illustrative wetting agents useful in the compositions of this disclosure include, for example, sulfosuclinate, and the like. The recommended amount of wetting agent to be added will be in the range of 0.1-6.0 wt % of the flame retardant solution.

Illustrative emulsifiers useful in the compositions of this disclosure include, for example, lauryl PEG-9 polydimethylsuloxyethyl dimethicone, alkybenzene sulfonates, polysorbates, sodium phosphates, sodium stearoyl lactylate, and the like. The recommended amount of emulsifier to be added will be in the range of 0.1-6.0 wt % of the flame retardant solution.

Illustrative foaming agents useful in the compositions of this disclosure include, for example, lauryl sulfate, and the like. The recommended amount of foaming agent to be added will be in the range of 0.1-6.0 wt % of the flame retardant solution.

Illustrative viscosity modifiers useful in the compositions of this disclosure include, for example, carboxymethylcellulose powder, acacia gum, beeswax, and the like. The recommended amount of viscosity modifier to be added will be in the range of 0.1-6.0 wt % of the flame retardant solution.

Illustrative corrosion inhibitors useful in the compositions of this disclosure include, for example, zinc borate, and the like. The recommended amount of corrosion inhibitor to be added will be in the range of 0.1-15 wt % of the flame retardant solution.

Illustrative thixotropic agents useful in the compositions of this disclosure include, for example, fumed silica, and the like. The recommended amount of thixotropic agent to be added will be in the range of 0.1-15 wt % of the flame retardant solution.

Illustrative leveling assistants useful in the compositions of this disclosure include, for example, decahydrated sodium sulfates, and the like. The recommended amount of leveling assistant to be added will be in the range of 0.1-6.0 wt % of the flame retardant solution.

Illustrative stabilizers useful in the compositions of this disclosure include, for example, butylated hydoxytoluene, and the like. The recommended amount of stabilizer to be added will be in the range of 0.1-15.0 wt % of the flame retardant solution.

Illustrative stabilizers useful in the compositions of this disclosure include, for example, butylated hydroxytoluene, and the like. The stabilizers include light stabilizers, for example hindered amine, and the like. The recommended amount of stabilizer to be added will be in the range of 0.1-15.0 wt % of the flame retardant solution.

Illustrative metal passivators useful in the compositions of this disclosure include, for example, nitric acid, and the like. The recommended amount of metal passivator to be added will be in the range of 0.1-15.0 wt % of the flame retardant solution.

Illustrative metal oxides useful in the compositions of this disclosure include, for example, zinc oxide, magnesium oxide, aluminum oxide, calcium oxide, sodium oxide, potassium oxide, antimony oxide, and the like. The recommended amount of metal oxide to be added will be in the range of 0.1-35.0 wt % of the flame retardant solution.

Illustrative organophosphorus compounds useful in the compositions of this disclosure include, for example, triazine polyphosphate esters, and the like. The recommended amount of organophosphorus compound to be added will be in the range of 0.1-30 wt % of the flame retardant solution.

The compositions of this disclosure can optionally include a solvent. The solvent can be any solvent suitable for use in the compositions of this disclosure. Illustrative solvents include, for example, organic solvents such as an aromatic compound, alcohol, ester, ether, ketone, amine, nitrated hydrocarbon, halogenated hydrocarbon, and the like. The recommended amount of solvent to be added will be in the range of 1-15 wt % of the flame retardant solution.

The incorporation of the ingredients or components described herein into the substrate material or component (e.g., polymer component) is carried out by known methods such as dry blending in the form of a powder, or wet mixing in the form of solutions, dispersions or suspensions for example in an inert solvent, water or oil. The additive components may be incorporated, for example, before or after molding or also by applying the dissolved or dispersed additive or additive mixture to the polymer material, with or without subsequent evaporation of the solvent or the suspension/dispersion agent. They may be added directly into the processing apparatus (e.g. extruders, internal mixers, etc.), e.g., as a dry mixture or powder, or as a solution or dispersion or suspension or melt.

The addition of the additive components to the substrate material (e.g., polymer substrate) can be carried out in customary mixing machines in which the polymer is melted and mixed with the additives. Suitable machines are known to those skilled in the art. They are predominantly mixers, kneaders and extruders.

In an embodiment, the process is carried out in an extruder by introducing the additive during processing.

Particularly useful processing machines are single-screw extruders, contra-rotating and co-rotating twin-screw extruders, planetary-gear extruders, ring extruders or co-kneaders. Processing machines provided with at least one gas removal compartment can be used to which a vacuum can be applied.

For example, the screw length is 1-60 screw diameters, preferably 35-48 screw diameters. The rotational speed of the screw is preferably 10-600 rotations per minute (rpm), preferably 25-300 rpm.

The maximum throughput is dependent on the screw diameter, the rotational speed and the driving force. The process can also be carried out at a level lower than maximum throughput by varying the parameters mentioned or employing weighing machines delivering dosage amounts.

If a plurality of components is added, these can be premixed or added individually.

The additive components can also be sprayed onto the polymer substrate. The additive mixture dilutes other additives, for example the conventional additives indicated above, or their melts so that they can be sprayed also together with these additives onto the polymer substrate. Addition by spraying during the deactivation of the polymerization catalysts is particularly advantageous; in this case, the steam evolved may be used for deactivation of the catalyst. In the case of spherically polymerized polyolefins it may, for example, be advantageous to apply the additives by spraying.

The additive components can also be added to the polymer in the form of a master batch ("concentrate") which contains the components in a concentration of, for example, about 1.0% to about 40.0% and preferably 2.0% to about 20.0% by weight incorporated in a polymer. The polymer is not necessarily of identical structure than the polymer where the additives are added finally. In such operations, the polymer can be used in the form of powder, granules, solutions, and suspensions or in the form of lattices.

Incorporation can take place prior to or during the shaping operation. The materials containing the additives described herein preferably are used for the production of molded articles, for example roto-molded articles, injection molded articles, profiles and the like, and especially a fiber, spun melt non-woven, film or foam.

In an embodiment, this disclosure provides a process for imparting flame retardancy to a substrate material. The process comprises adding to a substrate material a flame retardant composition. The flame retardant composition comprises at least one flame retardant salt, a nitrogen-containing compound, and optionally water.

The flame retardant compositions of this disclosure can be used in a variety of products, in particular, four major areas including electronics and electrical devices, building and construction materials, furnishings, and transportation (e.g., airplanes, trains, motor vehicles and marine transportation).

Illustrative electronics and electrical devices include, for example, television and other electronic device casings; computers and laptops, including monitors, keyboards and portable digital devices; telephones and cell phones; refrigerators; washers and dryers; vacuum cleaners; electronic circuit boards; electrical and optical wires and cables; small household appliances; battery chargers; and the like.

Illustrative building and construction materials include, for example, electrical wires and cables, including those behind walls; insulation materials (e.g., polystyrene and polyurethane insulation foams); paints and coatings which are applied to a variety of building materials, including steel structures, metal sheets, wood, plaster and concrete; structural and decorative wood products; roofing components; composite panels; decorative fixtures; and the like Illustrative furnishings include, for example, natural and synthetic filling materials and textile fibers; foam upholstery; foam mattresses; curtains and fabric blinds; carpets; and the like.

Illustrative transportation (airplanes, trains, automobiles) includes, for example, overhead compartments; seat covers and fillings; seats, headrests and armrests; roof liners; textile carpets; curtains; sidewall and ceiling panels; internal structures, including dashboards and instrument panels; insulation panels; electrical and electronic cable coverings; electrical and electronic equipment; battery cases and trays; car bumpers; stereo components; GPS and other computer systems; and the like.

Preferred embodiments of this disclosure are described in the following clauses:

1. A composition comprising one or more substrate materials and a flame retardant composition, said flame retardant composition comprising at least one flame retardant salt, a nitrogen-containing compound, and optionally water.

2. The composition of clause 1 wherein the at least one flame retardant salt comprises an ammonium salt of phosphoric acid, and the nitrogen-containing compound comprises urea.

3. The composition of clause 2 wherein the ammonium salt of phosphoric acid comprises water soluble ammonium polyphosphate (APP).

4. The composition of clause 3 wherein the ammonium salt of phosphoric acid comprises water soluble ammonium polyphosphate (APP), ammonium dihydrogen phosphate (MAP), and di-ammonium hydrogen phosphate (DAP).

5. The composition of clause 1 wherein the at least one flame retardant salt comprises an ammonium salt of phosphoric acid and an ammonium salt of bromine; and the nitrogen-containing compound comprises urea.

6. The composition of clause 5 wherein the ammonium salt of phosphoric acid comprises water soluble ammonium polyphosphate (APP), and the ammonium salt of bromine comprises ammonium bromide.

7. The composition of clause 3 wherein the water soluble ammonium polyphosphate has a total nitrogen as N from about 5 to about 15 weight percent, and a total phosphorus as $P_2O_5$ from about 30 to about 40 weight percent, based on the total weight of the ammonium polyphosphate.

8. The composition of clause 3 wherein the water soluble ammonium polyphosphate has a density from about 1.75 to about 1.90 $g/cm^3$, a water solubility of greater than about 60 g/100 ml, and a pH from about 6.5 to about 8.5.

9. The composition of clause 1 comprising from about 10 to about 90 weight percent of the at least one flame retardant salt, and from about 10 to about 60 weight percent of the at least one nitrogen-containing compound; wherein the entirety of the components is 100 weight percent.

10. The composition of clause 1 comprising from about 10 to about 90 weight percent of the at least one flame retardant salt, from about 10 to about 60 weight percent of the at least one nitrogen-containing compound, and from about 1 to about 95 weight percent of water; wherein the entirety of the components is 100 weight percent.

11. The composition of clause 1 wherein the substrate material is at least one selected from the group consisting of electronics or electrical devices, building or construction materials, furnishings, clothing, and transportation.

12. The composition of clause 1 wherein the substrate material is at least one material selected from the group consisting of: polymers, rubbers, paper pulps, textiles, foams, metals, lumber, concrete, stone, paints, adhesives, and nano particles.

13. The composition of clause 12 wherein the polymer comprises a thermoplastic polymer or a thermoset polymer; wherein the thermoplastic polymer is at least one selected from the group consisting of: high impact polystyrene, polyphenylene ethers, polyamides, polyesters, polycarbonates, polyolefins, polyethers, and blends or polyblends of the type represented by ABS (acrylonitrile-butadiene-styrene) or PC/ABS (polycarbonate/acrylonitrile-butadiene-styrene), polyamide, polyester, polyarylates, polymethacrylates, or ABS; and wherein the thermoset polymer is at least one selected from the group consisting of: formaldehyde, epoxy, melamine, or phenolic resin polymers, and polyurethanes.

14. The composition of clause 1 wherein the substrate material is present in an amount from about 5 weight percent to about 95 weight percent, and the flame retardant composition is present in an amount from about 5 weight percent to about 95 weight percent, wherein the entirety of the components is 100 weight percent.

15. The composition of clause 1 wherein the flame retardant composition is sprayed onto the substrate material, impregnated into the substrate material, the substrate material is dipped into the flame retardant composition, or the flame retardant is added to a fiber yarn.

16. The composition of clause 1 further comprising at least one additive selected from the group consisting of a pigment, a dye, a plasticizer, an antioxidant, a surfactant, a dispersant, a detergent, a wetting agent, an emulsifier, an adsorbent, a binder, a suppressant, a thixotropic agent, a leveling assistant, a basic co-stabilizer, a metal passivator, a metal oxide, an organophosphorus compound, a corrosion inhibitor, a foaming agent, a viscosity modifier, and a light stabilizer.

17. The composition of clause 1 further comprising at least one additive selected from the group consisting of alum (hydrated potassium aluminum sulfate), sodium stannate, sodium or potassium silicate (liquid glass), sodium borate (borax), carboxymethyl cellulose, starch-like compound, organophosphorus nitrogen compound, glycerin or glycerol, isocyanate, polyurethane, organosilicone, pentaerythitol, and 4A natural zeolite.

18. The composition of clause 1 further comprising a solvent.

19. The composition of clause 18 wherein the solvent is at least one selected from the group consisting of aromatic compounds, alcohols, esters, ethers, ketones, amines, nitrated hydrocarbons, and halogenated hydrocarbons.

20. The composition of clause 1 which is a powder, solution, dispersion, suspension, or melt.

21. A composition comprising one or more substrate materials and a flame retardant composition, said flame retardant composition comprising at least one flame retardant salt, a nitrogen-containing compound, and optionally water; wherein the at least one flame retardant salt comprises water soluble ammonium polyphosphate (APP); and the nitrogen-containing compound comprises urea.

22. A composition comprising one or more substrate materials and a flame retardant composition, said flame retardant composition comprising at least one flame retardant salt, a nitrogen-containing compound, and optionally water; wherein the at least one flame retardant salt comprises water soluble ammonium polyphosphate (APP), ammonium dihydrogen phosphate (MAP), and di-ammonium hydrogen phosphate (DAP); and the nitrogen-containing compound comprises urea.

23. A composition comprising one or more substrate materials and a flame retardant composition, said flame retardant composition comprising at least one flame retardant salt, a nitrogen-containing compound, and optionally water; wherein the at least one flame retardant salt comprises water soluble ammonium polyphosphate (APP) and ammonium bromide; and the nitrogen-containing compound comprises urea.

24. A composition comprising one or more substrate materials and a flame retardant composition, said flame retardant composition comprising at least one flame retardant salt, optionally a nitrogen-containing compound, and optionally water; wherein the at least one flame retardant salt comprises water soluble ammonium polyphosphate (APP).

25. A flame retardant composition comprising at least one flame retardant salt, optionally a nitrogen-containing compound, and optionally water, wherein the at least one flame retardant salt comprises water soluble ammonium polyphosphate (APP), and wherein the water soluble ammonium polyphosphate (APP) has a density from about 1.75 to about 1.90 g/cm$^3$, a water solubility of greater than about 60 g/100 ml, a pH from about 6.5 to about 8.5, and a total nitrogen as N from about 5 to about 15 weight percent, and a total phosphorus as $P_2O_5$ from about 30 to about 40 weight percent, based on the total weight of the ammonium polyphosphate (APP).

26. The flame retardant composition of clause 25 further comprising at least one additive selected from the group consisting of a pigment, a dye, a plasticizer, an antioxidant, a surfactant, a dispersant, a detergent, a wetting agent, an emulsifier, an adsorbent, a binder, a suppressant, a thixotropic agent, a leveling assistant, a basic co-stabilizer, a metal passivator, a metal oxide, an organophosphorus compound, a corrosion inhibitor, a foaming agent, a viscosity modifier, and a UV light stabilizer.

27. The flame retardant composition of clause 25 further comprising at least one additive selected from the group consisting of alum (hydrated potassium aluminum sulfate), sodium stannate, sodium or potassium silicate (liquid glass), sodium borate (borax), carboxymethyl cellulose, starch-like compound, organophosphorus nitrogen compound, glycerin or glycerol, isocyanate, polyurethane, organosilicone, pentaerythitol, and 4A natural zeolite.

28. The flame retardant composition of clause 27 further comprising a solvent.

29. The flame retardant composition of clause 28 wherein the solvent is at least one selected from the group consisting of aromatic compounds, alcohols, esters, ethers, ketones, amines, nitrated hydrocarbons, and halogenated hydrocarbons.

30. The flame retardant composition of clause 25 which is a powder, solution, dispersion, suspension, melt, gel, or grease.

31. An article formed from a composition comprising one or more substrate materials and a flame retardant composition, said flame retardant composition comprising at least one flame retardant salt, a nitrogen-containing compound, and optionally water, wherein said article comprises (i) a polymer article selected from the group consisting of a polymer molding, a polymer film, a polymer filament and a polymer fiber; or (ii) an extrusion article formed by extrusion, injection molding, or a combination thereof.

32. The article of clause 31 wherein the at least one flame retardant salt comprises water soluble ammonium polyphosphate (APP), and the nitrogen-containing compound comprises urea.

33. A process for the production of an extruded article, said process comprising:
heating a polymer to form a polymer melt;
adding a flame retardant powder composition to the polymer melt to form a flame retardant polymer melt, said flame retardant composition comprising at least one flame retardant salt, and a nitrogen-containing compound; and
extruding the flame retardant polymer melt to give an extruded article.

34. The process of clause 33 wherein the at least one flame retardant salt comprises water soluble ammonium polyphosphate (APP), and the nitrogen-containing compound comprises urea.

35. An extrudable composition comprising a flame retardant polymer melt, wherein the flame retardant polymer melt comprises a polymer melt and a flame retardant composition, said flame retardant composition comprising at least one flame retardant salt, a nitrogen-containing compound, and optionally one or more metals.

36. The extrudable composition of clause 35 wherein the metal is aluminum.

37. A process for imparting flame retardancy to a substrate material, said process comprising:
adding to a substrate material a flame retardant composition, said flame retardant composition comprising at least one flame retardant salt, a nitrogen-containing compound, and optionally water.

38. The process of clause 37 wherein the at least one flame retardant salt comprises water soluble ammonium polyphosphate (APP), and the nitrogen-containing compound comprises urea 39. A process for preparing a flame retardant composition, said process comprising:

adding to a container at least one flame retardant salt, a nitrogen-containing compound, and optionally water; and mixing the contents of the container to give a dispersed mixture or dissolved solution comprising the flame retardant composition.

40. The process of clause 39 wherein the at least one flame retardant salt comprises water soluble ammonium polyphosphate (APP), and the nitrogen-containing compound comprises urea.

41. An intumescent process for forming an insulating protective layer on a substrate, said process comprising:

providing a flame retardant composition comprising at least one flame retardant salt, a nitrogen-containing compound, and optionally water; wherein the at least one flame retardant salt comprises an ammonium salt of phosphoric acid, and the nitrogen-containing compound comprises urea;

heating the ammonium salt of phosphoric acid to give an inorganic acid;

carbonizing the inorganic acid with a polyalcohol present in the substrate;

hydrolyzing the urea to give ammonia and reacting the ammonia to give nitrogen gas;

foaming the mixture of the carbonized inorganic acid and the nitrogen gas; and solidifying the foam through one or more cross linking reactions to form the insulating protective layer on the substrate.

42. The process of clause 41 wherein the at least one flame retardant salt comprises water soluble ammonium polyphosphate (APP).

The following non-limiting examples are provided to illustrate the disclosure.

EXAMPLES

Comparative Flame Retardant Composition

A comparative flame retardant composition was prepared having the following ingredients in the indicated amounts: ammonium dihydrogen phosphate (MAP) (10-20 wt %); di-ammonium hydrogen phosphate (DAP) (10-20 wt %); ammonium bromide (30-50 wt %); ammonium sulfate (10-20 wt %); and urea (10-20 wt %).

In testing, the comparative flame retardant composition cannot withstand any washing (especially on cotton). The comparative flame retardant composition exhibited clumping, and became jelly-like after storage for long time (e.g., months). In testing on a textile, particles of the comparative flame retardant composition dropped off from treated textiles upon shaking. The comparative flame retardant composition is corrosive to metals.

Flame Retardant Composition of this Disclosure

A flame retardant composition of this disclosure was prepared having the following ingredients in the indicated amounts: water soluble ammonium polyphosphate (APP) (40-60 wt %); ammonium dihydrogen phosphate (MAP) (10-25 wt %); di-ammonium hydrogen phosphate (DAP) (10-25 wt %); and urea (10-25 wt %).

In testing, the flame retardant composition of this disclosure did not exhibit clumping, and did not become jelly-like after storage for long time (e.g., months). In testing on a textile, particles of the flame retardant composition of this disclosure did not drop off from treated textiles upon shaking. The flame retardant composition of this disclosure is not corrosive to metals.

Other Flame Retardant Compositions of this Disclosure

A flame retardant composition of this disclosure was prepared having the following ingredients in the indicated amounts: water soluble ammonium polyphosphate (APP) (40-60 wt %); ammonium dihydrogen phosphate (MAP) (10-25 wt %); di-ammonium hydrogen phosphate (DAP) (10-25 wt %); ammonium bromide (10-25 wt %); ammonium sulfate (10-25 wt %); carboxymethyl cellulose (CMC) (1-10 wt %); sodium borate (borax) (1-10 wt %); sodium silicate (1-10 wt %); and urea (10-25 wt %).

Another flame retardant composition of this disclosure was prepared having the following ingredients in the indicated amounts: water soluble ammonium polyphosphate (APP) (40-60 wt %); ammonium dihydrogen phosphate (MAP) (10-25 wt %); di-ammonium hydrogen phosphate (DAP) (10-25 wt %); ammonium chloride (10-25 wt %); hydrated potassium aluminum sulfate (alum) (10-25 wt %); carboxymethyl cellulose (CMC) (1-10 wt %); sodium borate (borax) (1-10 wt %); sodium silicate (1-10 wt %); and urea (10-25 wt %).

In testing, the above other flame retardant compositions of this disclosure exhibited improved thermal protection performance (TPP) versus the comparative flame retardant composition.

A flame retardant composition of this disclosure was prepared having the following ingredients in the indicated amounts: water soluble ammonium polyphosphate (APP) (40-60 wt %); ammonium sulfate (10-25 wt %); starch-like compounds (cassava liquid, sweet potato, tapioca extract or catalase) (10-25 wt %); sodium borate (borax) (1-10 wt %); sodium silicate (1-10 wt %); and sodium stannate (1-10 wt %).

Another flame retardant composition of this disclosure was prepared having the following ingredients in the indicated amounts: water soluble ammonium polyphosphate (APP) (40-60 wt %); hydrated potassium aluminum sulfate (alum) (10-25 wt %); starch-like compounds (cassava liquid, sweet potato, tapioca extract or catalase) (10-25 wt %); and ammonium dihydrogen phosphate (MAP) (10-25 wt %).

In testing, the above other flame retardant compositions of this disclosure exhibited improved retention of flame retardancy after numerous cycles of washing versus the comparative flame retardant composition.

The chemical composition of the flame retardant of this disclosure indicates multiple mechanisms of flame retardation including inert gas dilution (ammonia), chemical interaction (bromide), and a protective layer (phosphate). These mechanisms of flame retardation are supported by the observed material behavior during a controlled burn test.

All patents and patent applications, test procedures (such as ASTM methods, UL methods, and the like), and other documents cited herein are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

While we have shown and described several embodiments in accordance with our disclosure, it is to be clearly understood that the same may be susceptible to numerous changes apparent to one skilled in the art. Therefore, we do not wish to be limited to the details shown and described but intend to show all changes and modifications that come within the scope of the appended claims.

What is claimed is:

1. A process for preparing a flame retardant composition, said process comprising:
adding to a container at least one flame retardant salt, a nitrogen-containing compound, and optionally water; and
mixing the contents of the container to give a dispersed mixture or dissolved solution comprising the flame retardant composition;
wherein the at least one flame retardant salt comprises an ammonium salt of phosphoric acid; wherein the ammonium salt of phosphoric acid comprises water soluble ammonium polyphosphate (APP); wherein the water soluble ammonium polyphosphate has a total nitrogen as N from about 5 to about 15 weight percent, and a total phosphorus as $P_2O_5$ from about 30 to about 40 weight percent, based on the total weight of the ammonium polyphosphate (APP).

2. The process of claim 1 wherein the nitrogen-containing compound comprises urea.

3. The process of claim 1 wherein the ammonium salt of phosphoric acid further comprises ammonium dihydrogen phosphate (MAP) and di-ammonium hydrogen phosphate (DAP).

4. The process of claim 1 wherein the at least one flame retardant salt further comprises an ammonium salt of bromine; and the nitrogen-containing compound comprises urea.

5. The process of claim 4 wherein the ammonium salt of bromine comprises ammonium bromide.

6. The process of claim 1 wherein the water soluble ammonium polyphosphate has a density from about 1.75 to about 1.90 $g/cm^3$, a water solubility of greater than about 60 g/100 ml, and a pH from about 6.5 to about 8.5.

7. The process of claim 1 wherein the flame retardant composition comprises from about 10 to about 90 weight percent of the at least one flame retardant salt, and from about 10 to about 60 weight percent of the at least one nitrogen-containing compound; wherein the entirety of the components is 100 weight percent.

8. The process of claim 1 wherein the flame retardant composition is sprayed onto a substrate material, impregnated into a substrate material, a substrate material is dipped into the flame retardant composition, or the flame retardant is added to a fiber yarn.

9. The process of claim 8 wherein the substrate material is selected from the group consisting of electronics or electrical devices, building or construction materials, furnishings, clothing, and transportation.

10. The process of claim 8 wherein the substrate material is at least one material selected from the group consisting of: polymers, rubbers, paper pulps, textiles, foams, metals, lumber, concrete, stone, paints, adhesives, and nano particles.

11. The process of claim 10 wherein the polymer comprises a thermoplastic polymer or a thermoset polymer; wherein the thermoplastic polymer is at least one selected from the group consisting of: high impact polystyrene, polyphenylene ethers, polyamides, polyesters, polycarbonates, polyolefins, polyethers, and blends or polyblends of the type represented by ABS (acrylonitrile-butadiene-styrene) or PC/ABS (polycarbonate/acrylonitrile-butadiene-styrene), polyamide, polyester, polyarylates, polymethacrylates, or ABS; and wherein the thermoset polymer is at least one selected from the group consisting of: formaldehyde, epoxy, melamine, or phenolic resin polymers, and polyurethanes.

12. The process of claim 8 wherein the substrate material is present in an amount from about 5 weight percent to about 95 weight percent, and the flame retardant composition is present in an amount from about 5 weight percent to about 95 weight percent, wherein the entirety of the components is 100 weight percent.

13. The process of claim 1 wherein the flame retardant composition further comprises at least one additive selected from the group consisting of a pigment, a dye, a plasticizer, an antioxidant, a surfactant, a dispersant, a detergent, a wetting agent, an emulsifier, an adsorbent, a binder, a suppressant, a thixotropic agent, a leveling assistant, a basic co-stabilizer, a metal passivator, a metal oxide, an organophosphorus compound, a corrosion inhibitor, a foaming agent, a viscosity modifier, and a light stabilizer.

14. The process of claim 1 wherein the flame retardant composition comprises at least one additive selected from the group consisting of alum (hydrated potassium aluminum sulfate), sodium stannate, sodium or potassium silicate (liquid glass), sodium borate (borax), carboxymethyl cellulose, starch-like compound, organophosphorus nitrogen compound, glycerin or glycerol, isocyanate, polyurethane, organosilicone, pentaerythitol, and 4A natural zeolite.

15. The process of claim 1 wherein the flame retardant composition further comprises a solvent.

16. The process of claim 1 wherein the flame retardant composition is a powder, solution, dispersion, suspension, or melt.

17. The process of claim 1 wherein the flame retardant composition comprises at least one flame retardant salt, optionally a nitrogen-containing compound, and optionally water, wherein the at least one flame retardant salt comprises water soluble ammonium polyphosphate (APP), and wherein the water soluble ammonium polyphosphate (APP) has a density from about 1.75 to about 1.90 $g/cm^3$, a water solubility of greater than about 60 g/100 ml, a pH from about 6.5 to about 8.5, and a total nitrogen as N from about 5 to about 15 weight percent, and a total phosphorus as $P_2O_5$ from about 30 to about 40 weight percent, based on the total weight of the ammonium polyphosphate (APP).

18. An intumescent process for forming an insulating protective layer on a substrate, said process comprising:
(a) providing a flame retardant composition comprising at least one flame retardant salt, a nitrogen-containing compound, and optionally water, in which the at least one flame retardant salt comprises an ammonium salt of phosphoric acid, and the nitrogen-containing compound comprises urea;
(b) heating the ammonium salt of phosphoric acid to produce an inorganic acid;
(c) carbonizing the inorganic acid with a polyalcohol present in the substrate;
(d) hydrolyzing the urea to produce ammonia and reacting the ammonia to produce nitrogen gas;
(e) foaming the mixture of the carbonized inorganic acid and the nitrogen gas; and
(f) solidifying the foam through one or more cross linking reactions to form the insulating protective layer on the substrate.

* * * * *